United States Patent
Komuro

(10) Patent No.: US 12,509,578 B2
(45) Date of Patent: Dec. 30, 2025

(54) RESIN COMPOSITION, METHOD FOR MANUFACTURING RESIN COMPOSITION, MOLDED OBJECT, MULTILAYER STRUCTURE, AND PACKAGING BODY

(71) Applicant: MITSUBISHI CHEMICAL CORPORATION, Tokyo (JP)

(72) Inventor: Ryohei Komuro, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 624 days.

(21) Appl. No.: 17/943,508

(22) Filed: Sep. 13, 2022

(65) Prior Publication Data

US 2023/0019812 A1 Jan. 19, 2023

Related U.S. Application Data

(63) Continuation of application No. PCT/JP2021/010957, filed on Mar. 18, 2021.

(30) Foreign Application Priority Data

Mar. 25, 2020 (JP) .................. 2020-054975
Apr. 30, 2020 (JP) .................. 2020-080263

(51) Int. Cl.
C08L 29/04 (2006.01)
B32B 27/30 (2006.01)
C08K 5/09 (2006.01)
C08K 5/098 (2006.01)
C08L 23/12 (2006.01)
C08L 25/04 (2006.01)

(52) U.S. Cl.
CPC ............ *C08L 29/04* (2013.01); *B32B 27/306* (2013.01); *C08K 5/09* (2013.01); *C08K 5/098* (2013.01); *C08L 23/12* (2013.01); *C08L 25/04* (2013.01); *C08L 2205/025* (2013.01); *C08L 2205/03* (2013.01)

(58) Field of Classification Search
CPC ....... B32B 27/306; B32B 27/32; C08L 25/06; C08L 2205/02; C08L 2205/025; C08L 2205/03; C08L 23/00–36; C08L 29/04; C08K 5/09; C08K 5/098
See application file for complete search history.

(56) References Cited

U.S. PATENT DOCUMENTS

| | | | |
|---|---|---|---|
| 4,826,735 A | 5/1989 | Ueki et al. | |
| 5,094,921 A | 3/1992 | Itamura et al. | |
| 5,260,371 A | 11/1993 | Chen | |
| 5,389,709 A | 2/1995 | Itamura et al. | |
| 6,388,007 B1 | 5/2002 | Nakatsukasa et al. | |
| 2002/0128391 A1 | 9/2002 | Nakatsukasa et al. | |
| 2010/0080943 A1 | 4/2010 | Uradnisheck | |
| 2013/0225756 A1 | 8/2013 | Igarashi et al. | |
| 2015/0299432 A1 | 10/2015 | Scheirs et al. | |
| 2016/0221313 A1 | 8/2016 | Kawai et al. | |
| 2019/0256700 A1 | 8/2019 | Hashimoto et al. | |
| 2020/0172712 A1 | 6/2020 | Komuro | |

FOREIGN PATENT DOCUMENTS

| | | | | |
|---|---|---|---|---|
| JP | S62-68837 A | 3/1987 | | |
| JP | H3-72539 A | 3/1991 | | |
| JP | H3-72542 A | 3/1991 | | |
| JP | H3-215032 A | 9/1991 | | |
| JP | H10-204229 A | 8/1998 | | |
| JP | 2002-234971 A | 8/2002 | | |
| JP | 2012-504689 A | 2/2012 | | |
| JP | 2015-71709 A | 4/2015 | | |
| JP | 2015071709 A | * 4/2015 | ............ B32B 27/08 |
| JP | 2018-141170 A | 9/2018 | | |
| JP | 2019-143001 A | 8/2019 | | |
| WO | WO 2012/060371 A1 | 5/2012 | | |
| WO | WO 2018/088347 A1 | 5/2018 | | |
| WO | WO 2019/083000 A1 | 5/2019 | | |

OTHER PUBLICATIONS

Partial machine translation of JP-2015071709-A (Year: 2015).*
ISR for PCT/JP2021/010957, dated Jun. 8, 2021 (w/ translation).
IPRP for PCT/JP2021/010957, dated Oct. 6, 2022 (w/ translation).
ESR for EP App. No. 21775396.1, dated Aug. 1, 2023.
Office Action for CN App. No. 202180023023.2, dated Jul. 14, 2023 (w/ translation).
Office Action for CN App. No. 202180023023.2, dated Feb. 7, 2023 (w/ translation).

* cited by examiner

*Primary Examiner* — Kregg T Brooks
(74) *Attorney, Agent, or Firm* — GREENBLUM & BERNSTEIN, P.L.C.

(57) ABSTRACT

A resin composition containing: a thermoplastic resin (A) that does not contain a polar group; a thermoplastic resin (B) that contains a polar group; an ethylene-vinyl alcohol copolymer (C) having an ethylene content of 20 to 60 mol %; acetic acid and/or a salt thereof (D); an aliphatic carboxylic acid (E) having 3 or more carbon atoms; and an aliphatic carboxylic acid metal salt (F) that is a metal salt of the aliphatic carboxylic acid (E), wherein the content of (A) is 66 to 99 wt. % with respect to the total sum of contents of the resin composition and the content of (C) is 0.1 to 25 wt. % with respect to the total sum of the contents of the resin composition.

13 Claims, No Drawings

RESIN COMPOSITION, METHOD FOR MANUFACTURING RESIN COMPOSITION, MOLDED OBJECT, MULTILAYER STRUCTURE, AND PACKAGING BODY

RELATED APPLICATIONS

This application is a continuation of International Application No. PCT/JP2021/010957, filed on Mar. 18, 2021, which claims priority to Japanese Patent Application No. 2020-054975, filed on Mar. 25, 2020, and Japanese Patent Application No. 2020-080263, filed on Apr. 30, 2020 the entire contents of each of which being herein incorporated by reference.

TECHNICAL FIELD

The present disclosure relates to a resin composition that contains a thermoplastic resin that does not contain a polar group, a thermoplastic resin that contains a polar group, and an ethylene-vinyl alcohol copolymer (hereinafter also referred to as "EVOH") having an ethylene content of 20 to 60 mol %, and more specifically relates to a resin composition that has excellent mechanical strength.

BACKGROUND ART

Laminates including a layer of a thermoplastic resin that does not contain a polar group, such as polyethylene or polypropylene, and a layer made of an EVOH (hereinafter may be abbreviated as an "EVOH layer") that has excellent gas barrier properties are conventionally molded into films, sheets, cups, trays, bottles, and the like and applied to various uses in which their properties are utilized. In particular, such laminates are commercially used as packaging materials for food and medicines, for example. When the molded objects described above are manufactured using such laminates including a thermoplastic resin layer that does not contain a polar group and an EVOH layer, scraps such as chips, end portions or other unnecessary portions, defective products, and waste of the molded objects after used in various applications are generated. Such scraps amount to 30% to 50% (area ratio) of the original laminates. Therefore, there are cases where these scraps are collected, melt molded, and reused as a recycled layer (so-called regrind layer, in the present disclosure, such a recycled layer may be referred to as a "regrind layer") that constitutes at least one layer of a laminate.

Also, activities for reducing plastic waste are becoming active in recent years, and there are cases where household waste of used containers formed from the above-described molded objects are collected, melt molded, and reused as recycled molded objects such as films, sheets, cups, trays, and bottles. Such recycling techniques are industrially advantageous from the viewpoint of waste reduction and economic efficiency and are practically used.

However, when collected laminates including a thermoplastic resin layer that does not contain a polar group and an EVOH layer are melted again to be reused as a regrind layer or a recycled molded object, the thermoplastic resin that does not contain a polar group and the EVOH are likely to cause a compatibility failure because compatibility between the thermoplastic resin that does not contain a polar group and the EVOH is poor. For example, die drool is generated when a molded object is manufactured, a fish eye or a hole is formed in a molded object, and an appearance defect such as formation of a wave pattern on a surface occurs.

Under the above circumstances, in order to improve the compatibility that causes die drool and an appearance defect described above, a technique of blending a saponified ethylene-vinyl acetate copolymer (hereinafter may be referred to as "EVA") having a high ethylene content is known (see PTL 1 to PTL 3).

Specifically, the saponified EVA having a high ethylene content has an ethylene content of 70 mol % or more and is characterized in having high compatibility with polyolefin.

In contrast, the EVOH described above is also a saponified EVA, but has an ethylene content of 20 to 60 mol % and is characterized in having excellent gas barrier properties.

The inventor of the present disclosure tried methods described in PTL 1 to PTL 3, and found that relatively good results were obtained regarding problems caused by the low compatibility between the thermoplastic resin that does not contain a polar group and the EVOH, but these techniques had a problem in that obtained regrind layers were discolored to yellow or red. Therefore, in order to suppress such discoloration, the inventor of the present disclosure also tried a method of reducing the content of the saponified EVA having a high ethylene content, but the compatibilization effect was reduced and improvements in problems (a reduction in mechanical strength) due to the compatibility failure were insufficient, and therefore, further improvement is desired.

On the other hand, a resin composition that contains, as a base resin, a resin obtained using an EVA and a saponified EVA having a high ethylene content in combination has been proposed as a modifier for modifying a compatibility failure of a regrind layer (see PTL 4). However, even if this resin composition was used, there was still room for improvement in the above-described problem of a reduction in mechanical strength.

Also, in order to improve the compatibility that causes a reduction in mechanical strength, it is known to use a technique of blending a thermoplastic resin that contains a polar group, such as maleic anhydride-modified polyethylene or maleic anhydride-modified polypropylene (see PTL 5). However, even if this resin composition was used, there was still room for improvement in the above-described problem of a reduction in mechanical strength.

CITATION LIST

Patent Literature

PTL 1: JP-A-HEI3(1991)-215032
PTL 2: JP-A-HEI3(1991)-72542
PTL 3: JP-A-HEI3(1991)-72539
PTL 4: JP-A-2002-234971
PTL 5: WO2012/060371

SUMMARY

The present disclosure was made in view of the above circumstances and provides a resin composition that makes it possible to obtain a molded object having excellent mechanical strength even when reusing, as a resin composition, collected chips, end portions or other unnecessary portions, or defective products, which are generated in the manufacture of a laminate containing a thermoplastic resin that does not contain a polar group, a thermoplastic resin that contains a polar group, and the EVOH, or collected waste of molded objects used in various applications. Also, the present disclosure provides a method for manufacturing the resin composition, a molded object, a multilayer structure, and a packaging body.

In view of the above circumstances, the inventor of the present disclosure carried out intensive studies and found that it is possible to obtain a resin composition that has excellent mechanical strength by using a thermoplastic resin (A) that does not contain a polar group, a thermoplastic resin (B) that contains a polar group, an EVOH (C), acetic acid and/or a salt thereof (D), an aliphatic carboxylic acid (E) having 3 or more carbon atoms, and an aliphatic carboxylic acid metal salt (F) that is a metal salt of the aliphatic carboxylic acid (E) in combination, and setting the content of the thermoplastic resin (A) that does not contain a polar group and the content of the EVOH (C) so as to fall within specific ranges.

That is, it is generally known that an aliphatic carboxylic acid metal salt promotes thermal decomposition of an EVOH and reduces mechanical strength of a resin composition containing the EVOH. Therefore, those skilled in the art avoid adding an aliphatic carboxylic acid metal salt when mechanical strength of a resin composition containing an EVOH is to be improved. However, the inventor of the present disclosure found that mechanical strength was improved contrary to conventional expectations when a thermoplastic resin that does not contain a polar group, a thermoplastic resin that contains a polar group, an EVOH, acetic acid and/or a salt thereof, an aliphatic carboxylic acid having 3 or more carbon atoms, and a metal salt of the aliphatic carboxylic acid were used in combination so as to satisfy a specific relationship.

As described above, a first aspect of the present disclosure is a resin composition containing: a thermoplastic resin (A) that does not contain a polar group; a thermoplastic resin (B) that contains a polar group; an EVOH (C); acetic acid and/or a salt thereof (D); an aliphatic carboxylic acid (E) having 3 or more carbon atoms; and an aliphatic carboxylic acid metal salt (F) that is a metal salt of the aliphatic carboxylic acid (E), wherein the thermoplastic resin (A) that does not contain a polar group is contained in an amount of 66 to 99 wt. % with respect to the total sum of contents of the resin composition, and the EVOH (C) is contained in an amount of 0.1 to 25 wt. % with respect to the total sum of the contents of the resin composition.

A second aspect is a method for manufacturing a resin composition including melt-kneading and pelletizing the resin composition according to the first aspect. A third aspect is a molded object obtained using the resin composition according to the first aspect. A fourth aspect is a multilayer structure including at least one layer made of the resin composition according to the first aspect. A fifth aspect is a packaging body formed from the multilayer structure according to the fourth aspect.

The resin composition according to the present disclosure contains: the thermoplastic resin (A) that does not contain a polar group; the thermoplastic resin (B) that contains a polar group; the EVOH (C); acetic acid and/or a salt thereof (D); the aliphatic carboxylic acid (E) having 3 or more carbon atoms; and the aliphatic carboxylic acid metal salt (F) that is a metal salt of the aliphatic carboxylic acid (E), wherein the thermoplastic resin (A) is contained in an amount of 66 to 99 wt. % with respect to the total sum of the contents of the resin composition, and the EVOH (C) is contained in an amount of 0.1 to 25 wt. % with respect to the total sum of the contents of the resin composition, and therefore, the resin composition has excellent mechanical strength.

When the thermoplastic resin (A) that does not contain a polar group is at least one selected from the group consisting of a polyolefin resin and a polystyrene resin, adaptability to recycling and economic efficiency are further improved.

When the thermoplastic resin (A) that does not contain a polar group is at least one selected from the group consisting of polyethylene, polypropylene, and polystyrene, adaptability to recycling and economic efficiency are further improved.

When the thermoplastic resin (B) containing a polar group is contained in an amount of 0.1 to 50 wt. % with respect to the total sum of the contents of the resin composition, mechanical strength, adaptability to recycling, and economic efficiency are further improved.

When the thermoplastic resin (B) containing a polar group is a modified thermoplastic resin that contains a carboxy group or an acid anhydride group, mechanical strength, adaptability to recycling, and economic efficiency are further improved.

When the thermoplastic resin (B) containing a polar group is at least one selected from the group consisting of a modified polyolefin resin that contains a carboxy group or an acid anhydride group and a polyvinyl acetate resin, mechanical strength, adaptability to recycling, and economic efficiency are particularly excellent.

When the acetic acid and/or a salt thereof (D) is contained in an amount of 0.01 to 1000 ppm in terms of acetic acid ion with respect to the total sum of the contents of the resin composition, mechanical strength is further improved.

When the aliphatic carboxylic acid (E) having 3 or more carbon atoms is contained in an amount of 0.0001 to 150 ppm in terms of carboxylic acid ion with respect to the total sum of the contents of the resin composition, mechanical strength is further improved.

When the aliphatic carboxylic acid metal salt (F) is contained in an amount of 0.01 to 90 ppm in terms of metal ion with respect to the total sum of the contents of the resin composition, mechanical strength is further improved.

The method for manufacturing a resin composition further improves mechanical strength of the resin composition.

The molded body obtained using the resin composition has excellent mechanical strength.

The multilayer structure including at least one layer made of the resin composition has excellent mechanical strength.

Furthermore, the packaging body according to the present disclosure is formed from the multilayer structure, and accordingly has excellent mechanical strength.

Description of Embodiments

The following describes the present disclosure in detail, but the following is an example of preferred embodiments.

In the present disclosure, "y and/or z (y and z being any configurations or components)" encompasses the three meanings "only y", "only z", and "y and z".

A resin composition according to the present disclosure contains a thermoplastic resin (A) that does not contain a polar group (hereinafter may be simply referred to as a "thermoplastic resin (A)"), a thermoplastic resin (B) that contains a polar group (hereinafter may be simply referred to as a "thermoplastic resin (B)"), an EVOH (C), acetic acid and/or a salt thereof (D), an aliphatic carboxylic acid (E) having 3 or more carbon atoms, and an aliphatic carboxylic acid metal salt (F) that is a metal salt of the aliphatic carboxylic acid (E). The following describes each component.

<Thermoplastic Resin (A)>

The thermoplastic resin (A) that does not contain a polar group used in the present disclosure is a thermoplastic resin that does not contain a polar group such as a hydroxyl group, a carboxy group, an amino group, or an amide group, and there is no particular limitation on the type of the thermoplastic resin (A).

Examples of the thermoplastic resin (A) include polyolefin resin, polystyrene resin, and fluorine resin. Any one of these may be used alone or two or more of these may be used in combination.

Examples of the polyolefin resin include homopolymers and copolymers of olefins including polyethylene (PE) such as linear low-density polyethylene (LLDPE), low-density polyethylene (LDPE), very-low-density polyethylene (VLDPE), medium-density polyethylene (MDPE), and high-density polyethylene (HDPE), polypropylene (PP), ethylene-propylene (block or random) copolymer, propylene-$\alpha$-olefin ($\alpha$-olefin having to 20 carbon atoms) copolymer, ethylene-$\alpha$-olefin ($\alpha$-olefin having 4 to 20 carbon atoms) copolymer, polybutene, polypentene, and polymethylpentene, polycyclic olefin, and a blend of any of these. Any one of these may be used alone or two or more of these may be used in combination. Of these, polyethylene (PE), an ethylene-propylene (block or random) copolymer, polypropylene (PP), and a blend of these are preferable from the viewpoint of economic efficiency and mechanical properties, and polyethylene (PE), polypropylene (PP), and an ethylene-propylene (block or random) copolymer are particularly preferable from the viewpoint of achieving particularly excellent effects of the present disclosure.

Ethylene and $\alpha$-olefin in the polyolefin resin may be plant-derived ethylene and $\alpha$-olefin that are derived from bioethanol, petroleum-derived ethylene and $\alpha$-olefin that are not derived from plants, or a combination of these two types. Various petroleum-derived $\alpha$-olefins are available, and accordingly, it is possible to easily adjust physical properties or the like of the polyolefin resin by manufacturing the polyolefin resin using those $\alpha$-olefins. When plant-derived ethylene and $\alpha$-olefin are used, the biomass degree of a final product can be further increased to reduce the impact on the environment.

The plant-derived ethylene and $\alpha$-olefin can be manufactured using a conventionally used method by fermenting a sugar solution or starch obtained from plants such as sugar cane, corn, or sweet potato using microorganisms such as yeast to produce bioethanol, heating the bioethanol in the presence of a catalyst, and causing an intramolecular dehydration reaction or the like to obtain plant-derived ethylene or $\alpha$-olefin (1-butene, 1-hexene, etc.). Also, plant-derived polyethylene resin can be manufactured using the obtained plant-derived ethylene or $\alpha$-olefin in the same manner as the manufacture of petroleum-derived polyethylene resin.

Methods for manufacturing plant-derived ethylene and $\alpha$-olefin and plant-derived polyethylene resin are described in detail in JP-A-2011-506628, for example. An example of plant-derived polyethylene resin that is preferably used in the present disclosure is Green PE manufactured by Braskem S. A.

Also, the polyolefin resin is preferably manufactured using a Ziegler type catalyst and contains chlorine derived from the catalyst in an amount of 0.01 to 500 ppm, preferably 0.1 to 400 ppm, more preferably 1 to 300 ppm, and particularly preferably 5 to 150 ppm. When such a polyolefin resin is used, the effects of the present disclosure can be exhibited more remarkably.

Examples of the polystyrene resin described above include: homopolymers and copolymers of styrene monomers such as styrene, $\alpha$-methylstyrene, vinyltoluene, chlorostyrene, ethylstyrene, i-propylstyrene, dimethylstyrene, and bromostyrene; copolymers obtained through copolymerization of a styrene monomer, which is a main component, and a vinyl monomer polymerizable with the styrene monomer; and so-called high-impact polystyrene, which is a copolymer of a styrene monomer and a rubber component such as butadiene, or a mixture or polymer of a diene rubber-like polymer and a homopolymer of a styrene monomer, a copolymer of styrene monomers, or a copolymer of a styrene monomer and a vinyl monomer. Any one of these polystyrene resins may be used alone or two or more of these may be used in combination.

Examples of the vinyl monomer polymerizable with a styrene monomer include: alkyl(meth)acrylates such as methyl(meth)acrylate, ethyl(meth)acrylate, butyl(meth)acrylate, and cetyl(meth)acrylate; and two-functional monomers such as (meth)acrylonitrile, dimethyl maleate, dimethyl fumarate, diethyl fumarate, ethyl fumarate, divinyl benzene, and alkylene glycol dimethacrylate. Any one of these vinyl monomers may be used alone or two or more of these may be used in combination.

Examples of the diene rubber-like polymer include polybutadiene, a styrene-butadiene copolymer, and a three-dimensional ethylene-propylene-non-conjugated diene copolymer.

As the polystyrene resin, a polystyrene resin that contains styrene in an amount of 50 mass % or more is preferable, and polystyrene is particularly preferable from the viewpoint of economic efficiency.

The thermoplastic resin (A) is preferably at least one selected from the group consisting of polyolefin resins and polystyrene resins from the viewpoint of excellent adaptability to recycling and economic efficiency, more preferably at least one selected from the group consisting of polyethylene, polypropylene, and polystyrene, and particularly preferably polypropylene.

The thermoplastic resin (A) typically has a melt flow rate (MFR, at 230° C. and a load of 2160 g) of 0.1 to 100 g/10 minutes, and preferably 0.5 to 50 g/10 minutes.

The content of the thermoplastic resin (A) is 66 to 99 wt. % with respect to the total sum of the contents of the resin composition. Preferably, the content is 70 to 98 wt. %, and more preferably 80 to 95 wt. %. In the present disclosure, excellent mechanical strength can be achieved due to the content of the thermoplastic resin (A) falling within the above range. When the content of the thermoplastic resin (A) is too small, mechanical strength becomes insufficient, and when the content is too large, gas barrier properties and heat resistant stiffness of a laminate structure become insufficient.

<Thermoplastic Resin (B)>

The thermoplastic resin (B) containing a polar group used in the present disclosure is not particularly limited as long as the thermoplastic resin is a resin other than the EVOH (C), which will be described later. Examples of the thermoplastic resin (B) include modified thermoplastic resin (modified polyolefin resin, modified polystyrene resin, etc.) that is obtained by chemically bonding unsaturated carboxylic acid or an anhydride thereof to the thermoplastic resin (A) through an addition reaction, a grafting reaction, or the like and that contains a carboxy group or an acid anhydride group, polyvinyl acetate resin, polyvinyl alcohol resin, ionomer resin modified with a metal ion, polyamide resin, polyester resin, polyurethane resin, polycarbonate resin, and acrylic resin. Any one of these may be used alone or two or more of these may be used in combination. Of these, a modified thermoplastic resin that contains a carboxy group or an acid anhydride group is preferable from the viewpoint of achieving excellent mechanical strength, adaptability to recycling, and economic efficiency. Also, from the viewpoint of achieving excellent mechanical strength, adaptability to recycling, and economic efficiency, it is preferable to use at least one selected from the group consisting of a polyolefin resin containing a carboxy group or an acid anhydride group and a polyvinyl acetate resin, and it is more preferable to use a polyolefin resin containing a carboxy group or an acid anhydride group and a polyvinyl acetate resin in combination.

The thermoplastic resin (A) used to obtain the modified thermoplastic resin containing a carboxy group or an acid anhydride group is preferably a polyolefin resin or a polystyrene resin described above for the thermoplastic resin (A).

Examples of the unsaturated carboxylic acid used to obtain the modified thermoplastic resin containing a carboxy group or an acid anhydride group include unsaturated dicarboxylic acid and unsaturated monocarboxylic acid.

Examples of the unsaturated dicarboxylic acid include maleic acid, fumaric acid, chloro maleic acid, himic acid, citraconic acid, and itaconic acid, and examples of the unsaturated monocarboxylic acid include acrylic acid, butanoic acid, crotonic acid, vinyl acetate, methacrylic acid, pentenoic acid, dodecenoic acid, linolic acid, angelic acid, and cinnamic acid.

Examples of the unsaturated carboxylic acid anhydride include acid anhydrides of the unsaturated dicarboxylic acids and unsaturated monocarboxylic acids listed above. Specific examples include maleic acid anhydride, himic acid anhydride, itaconic acid anhydride, citraconic acid anhydride, and acrylic acid anhydride. Two or more of the unsaturated carboxylic acids and unsaturated carboxylic acid anhydrides may be used in combination. Of these, maleic acid anhydride is particularly preferable from the viewpoint of more effectively achieving the effects of the present disclosure and also from the viewpoint of adaptability to recycling and economic efficiency.

The modified thermoplastic resin typically has an acid value of 0.01 to 120 mgKOH/g, preferably 0.5 to 10 mgKOH/g, more preferably 0.5 to 7 mgKOH/g, further preferably 0.5 to 5 mgKOH/g, and particularly preferably 0.5 to 3 mgKOH/g. When the acid value of the modified thermoplastic resin is too low, dispersibility of the EVOH (C) in the resin composition tends to decrease and mechanical strength of an obtained molded product tends to decrease. When the acid value of the modified thermoplastic resin is too high, fluidity of the resin composition tends to be impaired and a layer thickness of the obtained molded product tends to be uneven. In a case where a mixture of a plurality of resins is used as the modified thermoplastic resin, a weighted average value that is calculated from acid values of the respective resins and a mass mixing ratio is taken as the acid value of the acid-modified thermoplastic resin.

As the polyvinyl acetate resin described above, it is possible to use a polyvinyl acetate resin that has a vinyl acetate content of 0.01 to 60 wt. % with respect to all monomer components when measured in accordance with JIS K6924-1, for example. From the viewpoint of more effectively achieving the effects of the present disclosure, the vinyl acetate content is preferably 0.02 to 50 wt. %, and particularly preferably 0.03 to 30 wt. %.

The polyvinyl acetate resin may also contain a monomer component that is copolymerizable with vinyl acetate, as a monomer component other than vinyl acetate. Examples of the other monomer component include: olefin monomers such ethylene and propylene; carboxyl group-containing monomers such as acrylic acid, methacrylic acid, maleic acid, fumaric acid, crotonic acid, and itaconic acid; monomers containing a carboxylic acid anhydride group such as maleic acid anhydride; (meth)acrylic acid esters such as (meth)acrylic acid alkyl esters having C1 to C18 alkyl groups; hydroxyl group-containing copolymerizable monomers such as hydroxyethyl (meth)acrylate and hydroxypropyl (meth)acrylate; epoxy group-containing copolymerizable monomers such as glycidyl (meth)acrylate; amino group-containing copolymerizable monomers such as N,N-dimethylaminoethyl (meth)acrylic acid alkyl ester; amide group-containing copolymerizable monomers such as (meth)acrylamide; cyano group-containing copolymerizable monomers such as (meth)acrylonitrile; styrene monomers such as styrene; and dienes such as butadiene and isoprene. Any one of these may be used alone or two or more of these may be used in combination. Of these, an ethylene-vinyl acetate copolymer is particularly preferable from the viewpoint of more effectively achieving the effects of the present disclosure.

The polyvinyl acetate resin may be saponified. That is, the polyvinyl acetate resin may contain a vinyl alcohol unit as a monomer unit. The polyvinyl acetate resin typically has a saponification degree of 20 mol % or more, more preferably 40 to 99.5 mol %, and particularly preferably 70 to 99 mol % from the viewpoint of more effectively achieving the effects of the present disclosure. However, if the saponified polyvinyl acetate resin is included in the EVOH (C), which will be described later, the saponified polyvinyl acetate resin is not included in the thermoplastic resin (B).

The polyvinyl acetate resin typically has a melt flow rate (MFR, at 190° C. and a load of 2160 g) of 0.1 to 100 g/10 minutes, more preferably 0.5 to 50 g/10 minutes, and particularly preferably 1 to 30 g/10 minutes from the viewpoint of more effectively achieving the effects of the present disclosure.

The polyvinyl acetate resin may be a modified polyvinyl acetate resin that contains a carboxy group and is obtained by chemically bonding unsaturated carboxylic acid or an anhydride thereof to the polyvinyl acetate resin through an addition reaction, a grafting reaction, or the like, as long as the gist of the present disclosure is not hindered. The modification amount is preferably 10 mol % or less, for example.

Examples of the unsaturated carboxylic acid or anhydride thereof include: ethylenically unsaturated monocarboxylic acids such as acrylic acid, methacrylic acid, ethacrylic acid, and crotonic acid; and ethylenically unsaturated dicarboxylic acids and anhydrides and half esters thereof such as fumaric acid, itaconic acid, citraconic acid, maleic acid, monomethyl maleate, monoethyl maleate, and maleic acid anhydride. Of these, maleic acid anhydride is preferably used from the viewpoint of more effectively achieving the effects of the present disclosure.

Any one of the polyvinyl acetate resins may be used alone or two or more of them that differ in the vinyl acetate content, saponification degree, molecular weight, MFR, density, modifying group, modification amount, or the like may be used in combination.

The polyvinyl alcohol resin described above (hereinafter may be referred to as "PVOH") is typically manufactured by saponifying a vinyl ester polymer obtained by polymerizing a vinyl ester compound, and can be manufactured using a known method with no particular limitation.

Examples of the vinyl ester compound include vinyl formate, vinyl acetate, vinyl trifluoroacetate, vinyl propionate, vinyl butyrate, vinyl caprate, vinyl laurate, vinyl versatate, vinyl palmitate, and vinyl stearate. Any one of these may be used alone or two or more of these may be used in combination, but vinyl acetate is preferable for practical use.

The PVOH may be a copolymer of the vinyl ester compound and a monomer copolymerizable with the vinyl ester compound. The content of the monomer that is copolymerizable with the vinyl ester compound and contained in the PVOH is preferably less than 20 mol %, more preferably 10 mol % or less, and particularly preferably 7 mol % or less.

Examples of the monomer copolymerizable with the vinyl ester compound include: olefins such as ethylene, propylene, isobutylene, α-octene, α-dodecene, and α-octadecene; unsaturated acids such as acrylic acid, methacrylic acid, crotonic acid, maleic acid, maleic acid anhydride, itaconic acid, and salts, monoalkyl esters, and dialkyl esters thereof; nitriles such as acrylonitrile and methacrylonitrile; amides such as acrylamide and methacrylamide; olefin sulfonic acids such as ethylene sulfonic acid, allyl sulfonic acid, and methallyl sulfonic acid, and salts thereof; alkyl vinyl ethers; polyoxyalkylene (meth)allyl ethers such as polyoxyethylene (meth)allyl ether and polyoxypropylene (meth)allyl ether; polyoxyalkylene (meth)acrylates such as polyoxyethylene (meth)acrylate and polyoxypropylene (meth) acrylate; polyoxyalkylene (meth)acrylamides such as polyoxyethylene (meth)acrylamide and polyoxypropylene (meth) acrylamide; polyoxyethylene[1-(meth)acrylamide-1,1-dimethylpropyl]ester, polyoxyethylene vinyl ether, polyoxypropylene vinyl ether, polyoxyethylene allylamine, polyoxypropylene allylamine, polyoxyethylene vinylamine, polyoxypropylene vinylamine, diacryl acetone amide, N-acrylamide methyl trimethylammonium chloride, allyl trimethylammonium chloride, dimethyl diallyl ammonium chloride, dimethyl allyl vinyl ketone, N-vinyl pyrrolidone, vinyl chloride, and vinylidene chloride. Any one of these may be used alone or two or more of these may be used in combination.

The PVOH is obtained by saponifying a vinyl ester polymer obtained by polymerizing the vinyl ester compound and the like. The vinyl ester polymer is dissolved in alcohol (e.g., methanol, ethanol, or butanol) and saponified in the presence of an alkaline catalyst (e.g., a hydroxide or alcoholate of alkali metal such as sodium hydroxide, potassium hydroxide, sodium methylate, sodium ethylate, or potassium methylate).

An average saponification degree of the PVOH is typically preferably 70 to 99.9 mol %, and more preferably 75 to 99 mol %. A mixture of two or more types of PVOH obtained as described above and having different saponification degrees may be used as necessary.

The above-described ionomer resin modified with a metal ion is a known thermoplastic resin that has a hydrophobic polymer backbone and an ionic group at a side chain. Examples of the ionomer resin include a sulfonic acid ionomer that has a structure in which some or all sulfonic acid groups of a sulfonic acid group-containing polymer are neutralized with metal ions and a carboxylic acid ionomer that has a structure in which some or all carboxy groups of an ethylene-unsaturated carboxylic acid copolymer are neutralized with metal ions.

Examples of metal ions that are typically used to neutralize acid moieties such as sulfonic acid groups and carboxy groups of the ionomer resin include: monovalent metal ions of lithium, sodium, potassium, rubidium, cesium, etc.; divalent metal ions of calcium, magnesium, iron, zinc, etc.; and trivalent metal ions of iron, aluminum, etc. It is desirable that the ionomer has a metal cation content of typically 0.4 to 4 mol, and preferably 0.6 to 2 mol per 1 kg of the ionomer. Regarding the degree of neutralization, it is preferable to use an ionomer resin in which 15 to 80%, or preferably 20 to 60% of the acid content in the copolymer component is neutralized with any of the metal cations listed above. In particular, an ionomer resin neutralized with a divalent metal ion is preferable, and an ionomer resin neutralized with zinc ion is particularly preferable from the viewpoint of affinity to the EVOH (C).

Specific examples of the sulfonic acid ionomer include a polystyrenesulfonate (PSS) ionomer and an ethylene sulfonate ionomer. Specific examples of the carboxylic acid ionomer include a carboxylate ionomer such as an ionomer of an ethylene-unsaturated carboxylic acid copolymer. Of these, a carboxylic acid ionomer is preferably used, and an ionomer of an ethylene-unsaturated carboxylic acid copolymer is particularly preferably used from the viewpoint of affinity to the EVOH (C).

Examples of the unsaturated carboxylic acid in the ionomer of an ethylene-unsaturated carboxylic acid copolymer include (meth)acrylic acid, maleic acid, fumaric acid, maleic acid anhydride, maleic acid monomethyl ester, and maleic acid monoethyl ester. Any one of these may be used alone or two or more of these may be used at the same time. Of these, (meth)acrylic acid is particularly preferable.

Also, the ionomer of an ethylene-unsaturated carboxylic acid copolymer may contain a small amount (e.g., less than 20 wt. %) of another monomer that can be a copolymerization component. Examples of the other monomer include vinyl esters such as vinyl acetate and unsaturated (meth) acrylic acid esters such as methyl (meth)acrylate, ethyl (meth)acrylate, isobutyl (meth)acrylate, n-butyl (meth)acrylate, and isooctyl (meth) acrylate.

That is, the ionomer resin is preferably an ethylene-(meth) acrylic acid copolymer neutralized with a divalent metal ion, and particularly preferably an ethylene-(meth)acrylic acid copolymer neutralized with zinc ion.

As the polyamide resin described above, it is possible to use a known homopolyamide resin or a known copolymerized polyamide resin.

Examples of the homopolyamide resin include polycaproamide (nylon 6), poly-ω-aminoheptanoic acid (nylon 7), poly-ω-aminononanoic acid (nylon 9), polyundecaneamide (nylon 11), and polylauryl lactam (nylon 12).

Examples of the copolymerized polyamide resin include: aliphatic polyamide such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryl lactam copolymer (nylon 6/12), caprolactam/ω-aminononanoic acid copolymer (nylon 6/9), caprolactam/hexamethylene diammonium adipate copolymer (nylon 6/66), lauryl lactam/hexamethylene diammonium adipate copolymer (nylon 12/66), ethylenediamine adipamide/hexamethylene diammonium adipate copolymer (nylon 26/66), caprolactam/hexamethylene diammonium adipate/hexamethylene diammonium sebacate copolymer (nylon 66/610), and ethylene ammonium adipate/hexamethylene diammonium adipate/hexamethylene diammonium sebacate copolymer (nylon 6/66/610); aromatic polyamide such as polyhexamethylene isophthalamide, polyhexamethylene terephthalamide, poly-m-xylylene adipamide, hexamethylene isophthalamide/terephthalamide copolymer, poly-p-phenylene terephthalamide, and poly-p-phenylene3,4'-diphenyl ether terephthalamide; amorphous polyamide; modified polyamide resin obtained by modifying any of these polyamide resins with aromatic amine such as methylene benzylamine or m-xylenediamine; and m-xylylene diammonium adipate. Furthermore, the polyamide resin may be a terminal-modified polyamide resin obtained by modifying a terminal end of the homopolyamide resin or the copolymerized polyamide resin. Any one of these may be used alone or two or more of these may be used in combination. Of these, a terminal-modified polyamide resin is preferable.

The polyester resin described above may be a polymer or copolymer obtained through a condensation reaction in which dicarboxylic acid and a diol or an ester derivative thereof are used as main components.

The dicarboxylic acid is preferably an aromatic dicarboxylic acid, and examples of the dicarboxylic acid include terephthalic acid, isophthalic acid, orthophthalic acid, 1,5-naphthalenedicarboxylic acid, 2,6-naphthalenedicarboxylic acid, 4,4'-biphenyldicarboxylic acid, 4,4'-biphenyl ether dicarboxylic acid, 4,4'-biphenyl methane dicarboxylic acid, 4,4'-biphenyl sulfone dicarboxylic acid, 4,4'-biphenyl isopropylidene dicarboxylic acid, 1,2-bis(phenoxy)ethane-4,4'-dicarboxylic acid, 2,5-anthracene dicarboxylic acid, 2,6-anthracene dicarboxylic acid, 4,4'-p-terphenylene dicarboxylic acid, and 2,5-pyridine dicarboxylic acid. A mixture of two or more of these dicarboxylic acids may be used.

Note that a small amount of one or more of: aliphatic dicarboxylic acid such as adipic acid, azelaic acid, sebacic acid, or dodecanedioic acid; alicyclic dicarboxylic acid such as cyclohexanedicarboxylic acid; and the like may be used together with the aromatic dicarboxylic acid.

Examples of the diol include: aliphatic diols such as ethylene glycol, propylene glycol, butylene glycol, hexylene glycol, neopentyl glycol, 2-methyl-1,3-propanediol, diethylene glycol, and triethylene glycol; alicyclic diols such as 1,4-cyclohexanedimethanol; and a mixture thereof.

Specific examples of the polyester resin include polyethylene terephthalate (hereinafter referred to as "PET"), polypropylene terephthalate, polybutylene terephthalate (hereinafter referred to as "PBT"), polyhexylene terephthalate, polyethylene naphthalate (hereinafter referred to as "PEN"), polybutylene naphthalate (hereinafter referred to as "PBN"), polyethylene-1,2-bis(phenoxy)ethane-4,4'-dicarboxylate, and copolyesters such as polyethylene isophthalate/terephthalate and polybutylene terephthalate/isophthalate. Of these, PET, PBT, PBN, and PEN have well-balanced mechanical properties and the like and can be preferably used.

The thermoplastic resin (B) used in the present disclosure is preferably a thermoplastic resin obtained through acid modification of the same thermoplastic resin as the thermoplastic resin (A) from the viewpoint of excellent compatibility with the thermoplastic resin (A). For example, when the thermoplastic resin (A) is polypropylene, the thermoplastic resin (B) is preferably acid-modified polypropylene, and when the thermoplastic resin (A) is polyethylene, the thermoplastic resin (B) is preferably acid-modified polyethylene.

Although reasons are not clear as to why excellent effects can be obtained by using the thermoplastic resin (B), it is presumed that a dispersion size of the EVOH (C) in the resin composition is reduced as a result of the thermoplastic resin (B) being used, and accordingly, energy absorption at the time of external deformation of the resin composition is facilitated, and mechanical strength is consequently improved.

The thermoplastic resin (B) typically has a melt flow rate (MFR, at 190° C. and a load of 2160 g) of 0.01 to 1000 g/10 minutes, preferably 0.05 to 800 g/10 minutes, more preferably 0.1 to 200 g/10 minutes, and particularly preferably 0.5 to 50 g/10 minutes. When the MFR of the thermoplastic resin (B) is within this range, balance between viscosities of the thermoplastic resin (B), the thermoplastic resin (A), and the EVOH (C) is good. As a result, dispersibility of the EVOH (C) tends to be further improved, and mechanical strength of a molded product obtained using the resin composition tends to be further improved.

From the viewpoint of mechanical strength, adaptability to recycling, and economic efficiency, the content of the thermoplastic resin (B) is preferably 0.1 to 50 wt. %, more preferably 0.3 to 25 wt. %, further preferably 0.5 to 15 wt. %, and particularly preferably 1.0 to 10 wt. % with respect to the total sum of the contents of the resin composition. When the content of the thermoplastic resin (B) is too small, dispersibility of the EVOH (C) tends to decrease and mechanical strength of a molded product obtained using the resin composition tends to be insufficient, and when the content is too large, affinity to the EVOH (C) becomes too high, a polymer with a high polymerization degree is likely to be generated, moldability of the resin composition tends to be insufficient, and mechanical strength of a molded product obtained using the resin composition tends to be insufficient.

<EVOH (C)>

The EVOH (C) used in the present disclosure is typically a resin obtained by saponifying an ethylene-vinyl ester copolymer obtained by copolymerizing ethylene and a vinyl ester monomer, and is a water-insoluble thermoplastic resin that is known as an ethylene-vinyl alcohol copolymer or a saponified ethylene-vinyl ester copolymer. Although any known polymerization method such as solution polymerization, suspension polymerization, or emulsion polymerization may be used, solution polymerization in which methanol is used as a solvent is commonly used. The obtained ethylene-vinyl ester copolymer may be saponified using a known method.

That is, the EVOH (C) used in the present disclosure is mainly constituted by an ethylene structural unit and a viny alcohol structural unit, and contains a small amount of vinyl ester structural unit that is left without being saponified.

Vinyl acetate is typically used as the vinyl ester monomer from the viewpoint of easy availability from the market and good processing efficiency of impurities at the time of manufacture. Other examples of the vinyl ester monomer include: aliphatic viny esters such as vinyl formate, vinyl propionate, vinyl valerate, vinyl butyrate, vinyl isobutyrate, vinyl pivalate, vinyl caprate, vinyl laurate, vinyl stearate, and vinyl versatate; and aromatic vinyl esters such as vinyl benzoate. Of these, aliphatic vinyl esters having 3 to 20 carbon atoms are preferable, aliphatic vinyl esters having 4 to 10 carbon atoms are more preferable, and aliphatic vinyl esters having 4 to 7 carbon atoms are particularly preferable. Typically, one of these is used alone, but two or more of these may be used at the same time as necessary.

Also, the EVOH (C) may further contain a structural unit derived from a comonomer described below in addition to the ethylene structural unit and the vinyl alcohol structural unit (including the unsaponified vinyl ester structural unit).

Examples of the comonomer include: α-olefins such as propylene, isobutene, α-octene, α-dodecene, and α-octadecene; hydroxy group-containing α-olefin derivatives including hydroxy group-containing α-olefins and esterified products and acylated products thereof such as 3-butene-1-ol, 4-pentene-1-ol, and 3-butene-1,2-diol; hydroxymethylvinylidene diacetates such as 1,3-diacetoxy-2-methylenepropane, 1,3-dipropionyloxy-2-methylenepropane, and 1,3-dibutylonyloxy-2-methylenepropane; unsaturated carboxylic acid or a salt, partial alkyl ester, complete alkyl ester, nitrile, amide, or anhydride thereof; unsaturated sulfonic acid or a salt thereof; vinylsilane compound; vinyl chloride; and styrene.

Furthermore, "post-modified" EVOH that is obtained through urethanization, acetalization, cyanoethylation, oxyalkylenation, or the like may be used as the EVOH (C) described above.

Among such modified EVOHs, an EVOH in which a primary hydroxyl group is introduced into a side chain through copolymerization is preferable to obtain good secondary moldability in a stretching treatment, vacuum compressed air forming, or the like, and in particular, an EVOH that has a 1,2-diol structure at a side chain is preferable.

The content of the ethylene structural unit in the EVOH (C) measured based on ISO14663 is 20 to 60 mol %, preferably 25 to 50 mol %, and particularly preferably 25 to 35 mol %. When the content is too small, gas barrier properties at high humidity and melt moldability are degraded. Conversely, when the content is too large, gas barrier properties are degraded.

The saponification degree of the EVOH (C) measured based on JIS K6726 (using a solution obtained by uniformly dissolving the EVOH in water/methanol solvent) is typically 90 to 100 mol %, preferably 95 to 100 mol %, and particularly preferably 99 to 100 mol %. When the saponification degree is too low, gas barrier properties, thermal stability, moisture resistance, and the like tend to be degraded.

The EVOH (C) typically has a melt flow rate (MFR, at 210° C. and a load of 2160 g) of 0.5 to 100 g/10 minutes, preferably 1 to 50 g/10 minutes, and particularly preferably 3 to 35 g/10 minutes. When the MFR is too high, film formability tends to be degraded. When the MFR is too low, melt extrusion tends to be difficult.

The EVOH (C) used in the present disclosure may be mixed with another EVOH that has a different ethylene content, a different saponification degree, or a different melt flow rate (MFR), contains a different copolymerization component, or has a different modification amount (e.g., a different content of a structural unit containing a primary hydroxyl group at a side chain), for example.

From the viewpoint of achieving excellent mechanical strength, the content of the EVOH (C) is 0.1 to 25 wt. %, preferably 0.3 to 20 wt. o, and more preferably 0.5 to 15 wt. % with respect to the total sum of the contents of the resin composition. When the content of the EVOH (C) is too small, gas barrier properties of a molded product obtained using the resin composition become insufficient, and when the content is too large, mechanical strength of the molded product becomes insufficient.

<Acetic Acid and/or Salt Thereof (D)>

The resin composition according to the present disclosure contains acetic acid and/or a salt thereof (D). Specific examples of acetic acid and/or a salt thereof (D) include acetic acid, sodium acetate, potassium acetate, calcium acetate, magnesium acetate, manganese acetate, copper acetate, cobalt acetate, and zinc acetate. Any one of these may be used alone or two or more of these may be used in combination. Of these, acetic acid, sodium acetate, potassium acetate, calcium acetate, and magnesium acetate are preferable, acetic acid, sodium acetate, and potassium acetate are more preferable, and acetic acid and sodium acetate are further preferable.

From the viewpoint of achieving excellent mechanical strength, the content of acetic acid and/or a salt thereof (D) in terms of acetic acid ion is preferably 0.01 to 1000 ppm, more preferably 0.1 to 800 ppm, further preferably 5 to 600 ppm, and particularly preferably 10 to 400 ppm with respect to the total sum of the contents of the resin composition.

When the content is too small, mechanical strength tends to decrease due to pyrolysate of an aliphatic carboxylic acid metal salt (F), which will be described later, and when the content is too large, the effects of the present disclosure tend not to be sufficiently achieved.

The content of acetic acid and/or a salt thereof (D) in terms of acetic acid ion can be measured using a known analysis method without no particular limitation. For example, it is possible to perform evaluation using liquid chromatography mass spectrometry (LC/MS), gas chromatography mass spectrometry (GC/MS), or the like.

In the resin composition of the present disclosure, the weight ratio of the content of the aliphatic carboxylic acid metal salt (F) in terms of metal ion to the content of acetic acid and/or a salt thereof (D) in terms of acetic acid ion (content of (F) in terms of metal ion/content of (D) in terms of acetic acid ion) is typically $0.001 \leq ((F)/(D)) \leq 1.3$, preferably $0.005 \leq ((F)/(D)) \leq 1.1$, more preferably $0.005 \leq ((F)/(D)) \leq 1.0$, and particularly preferably $0.01 \leq ((F)/(D)) \leq 0.8$. When the weight ratio is within the above range, the effects of the present disclosure tend to be exhibited more remarkably. When the weight ratio is lower than the above range, the effects of the present disclosure tend not to be sufficiently achieved. When the weight ratio is higher than the above range, adhesive strength tends to be insufficient.

Although reasons are not clear as to why excellent effects can be obtained when the ratio $((F)/(D))$ between the content of acetic acid and/or a salt thereof (D) and the content of the aliphatic carboxylic acid metal salt (F), which will be described later, is within the above range, it is presumed that acetic acid and/or a salt thereof (D) contained in a specific amount has an effect of scavenging pyrolysate of the aliphatic carboxylic acid metal salt (F) and suppressing a reduction in the adhesive strength, but when the content of acetic acid and/or a salt thereof (D) is too large, thermal stability of the EVOH (C) is significantly reduced and accordingly, the effects of the present disclosure cannot be sufficiently achieved.

<Aliphatic Carboxylic Acid (E) Having 3 or More Carbon Atoms>

The resin composition according to the present disclosure contains an aliphatic carboxylic acid other than acetic acid, i.e., an aliphatic carboxylic acid (E) having 3 or more carbon atoms (hereinafter may be referred to as "aliphatic carboxylic acid (E)"), and the aliphatic carboxylic acid (E) typically has 3 to 30 carbon atoms, preferably has 4 to 20 carbon atoms, and particularly preferably has 5 to 14 carbon atoms. An aliphatic carboxylic acid (E) having carbon atoms within the above range is preferable from the viewpoint of economic efficiency.

Examples of the aliphatic carboxylic acid (E) include aliphatic monocarboxylic acid having a carboxy group, aliphatic dicarboxylic acid having two carboxy groups, and aliphatic tricarboxylic acid having three carboxy groups.

Examples of the aliphatic monocarboxylic acid include: saturated aliphatic monocarboxylic acids such as butyric acid, valeric acid, caproic acid, enanthic acid, caprylic acid, pelargonic acid, capric acid, lauric acid, myristic acid, pentadecylic acid, palmitic acid, margaric acid, stearic acid, 12-hydroxystearic acid, arachidic acid, heneicosylic acid, behenic acid, lignoceric acid, montanoic acid, melissic acid, tartronic acid, glyceric acid, hydroxybutyric acid, malic acid, tartaric acid, gluconic acid, mevalonic acid, and pantoic acid; and unsaturated aliphatic monocarboxylic acids such as linoleic acid, linolenic acid, pinolenic acid, eleostearic acid, isostearic acid, isononanoic acid, 2-ethylhexanoic acid, 2-heptylundecanoic acid, 2-octyldodecanoic acid, palmitoleic acid, sapienic acid, oleic acid, elaidic acid, vaccenic acid, gadoleic acid, eicosenoic acid, erucic acid, nervonic acid, and ricinoleic acid.

Examples of the aliphatic dicarboxylic acid include: saturated aliphatic dicarboxylic acids such as succinic acid, adipic acid, pimelic acid, suberic acid, azelaic acid, and sebacic acid; and unsaturated aliphatic dicarboxylic acids such as eicosadienoic acid and docosadienoic acid.

Examples of the aliphatic tricarboxylic acid include saturated aliphatic tricarboxylic acids such as citric acid, isocitric acid, and aconitic acid.

Any one of these aliphatic carboxylic acids (E) may be used alone or two or more of them may be used in combination. From the viewpoint of thermal stability (preventing an increase in viscosity at the time of melt molding and generation of a fish eye), aliphatic monocarboxylic acids having a carboxy group are preferable, saturated aliphatic monocarboxylic acids are more preferable, and stearic acid, caproic acid, caprylic acid, lauric acid, and behenic acid are particularly preferable.

From the viewpoint of achieving excellent mechanical strength, the content of the aliphatic carboxylic acid (E) in terms of carboxylic acid ion is preferably 0.0001 to 150 ppm, more preferably 0.001 to 100 ppm, further preferably 0.005 to 75 ppm, and particularly preferably 0.01 to 50 ppm with respect to the total sum of the contents of the resin composition.

When the content is too small, thermal stability of the aliphatic carboxylic acid metal salt (F), which will be described later, tends to be insufficient and consequently the effects of the present disclosure tend not to be sufficiently achieved, and when the content is too large, the aliphatic carboxylic acid (E) itself acts as a plasticizer and the effects of the present disclosure tend not to be sufficiently achieved. Note that the content of the aliphatic carboxylic acid (E) in terms of carboxylic acid ion can be determined using a method described later.

<Aliphatic Carboxylic Acid Metal Salt (F)>

The resin composition according to the present disclosure contains the aliphatic carboxylic acid metal salt (F) that is a metal salt of the aliphatic carboxylic acid (E).

Examples of the metal species of the aliphatic carboxylic acid metal salt (F) include: alkali metals such as lithium, sodium, and potassium; alkaline earth metals such as beryllium, magnesium, calcium, and barium; and transition metals such as chromium, cobalt, nickel, copper, iron, and zinc. In order to effectively achieve the effects of the present disclosure, the metal species is preferably sodium, potassium, calcium, magnesium, iron, or zinc, more preferably sodium, calcium, magnesium, or zinc, and particularly preferably zinc, which makes it possible to achieve particularly excellent effects and is inexpensive and easily available.

Although reasons are not clear as to why excellent effects can be obtained by using the aliphatic carboxylic acid metal salt (F), it is presumed that interactions between the thermoplastic resin (A), the thermoplastic resin (B), and the EVOH (C) contained in the resin composition are enhanced as a result of the aliphatic carboxylic acid metal salt (F) being used, and accordingly, molecular orientation or a higher-order structure such as a crystal structure formed when the resin composition is extrusion-molded becomes highly uniform, and mechanical strength is consequently improved.

As the anion species of the aliphatic carboxylic acid metal salt (F), it is possible to use the examples of the aliphatic carboxylic acid (E) described above. In the present disclosure, it is important that the anion species of the aliphatic carboxylic acid metal salt (F) and the anion species of the aliphatic carboxylic acid (E) are the same species. As a result of the anion species of the aliphatic carboxylic acid metal salt (F) and the aliphatic carboxylic acid (E) being the same species, a resin composition that has excellent mechanical strength can be obtained.

In a case where the resin composition of the present disclosure contains a plurality of aliphatic carboxylic acids (E) or a plurality of aliphatic carboxylic acid metal salts (F), it is sufficient that at least one aliphatic carboxylic acid (E) and the anion species of the aliphatic carboxylic acid metal salt (F) are the same species.

Although reasons are not clear as to why excellent effects can be obtained when the aliphatic carboxylic acid (E) and the anion species of the aliphatic carboxylic acid metal salt (F) are the same species, it is presumed that when an aliphatic carboxylic acid (E) and an aliphatic carboxylic acid metal salt (F) of which the anion species is the same species as the aliphatic carboxylic acid (E) are used in combination, dispersibility of the aliphatic carboxylic acid metal salt (F) is significantly improved and even better effects of the present disclosure can be obtained. Also, it is thought that the aliphatic carboxylic acid (E) interacts with the metal species of the aliphatic carboxylic acid metal salt (F) and exists in a state like that of a metal complex, and it is presumed that, as a result of the anion species of the aliphatic carboxylic acid metal salt (F) and the aliphatic carboxylic acid (E) being the same species, the aliphatic carboxylic acid (E) can exist more stably in terms of energy, thermal stability at the time of melt molding becomes excellent, and consequently mechanical properties of the resin composition are improved.

From the viewpoint of achieving excellent mechanical strength, the content of the aliphatic carboxylic acid metal salt (F) in terms of metal ion is preferably 0.01 to 90 ppm, more preferably 0.05 to 80 ppm, further preferably 0.08 to 60 ppm, and particularly preferably 0.1 to 50 ppm with respect to the total sum of the contents of the resin composition. When the content of the aliphatic carboxylic acid metal salt (F) is too small or too large, the effects of the present disclosure tend not to be sufficiently achieved.

The content of the aliphatic carboxylic acid metal salt (F) in terms of metal ion and the content of the aliphatic carboxylic acid (E) in terms of carboxylic acid ion can be measured using known analysis methods with no particular limitation. For example, any one of the following methods may be used alone or two or more of the following methods may be used in combination.

[Content of Aliphatic Carboxylic Acid Metal Salt (F) in Terms of Metal Ion]

A dried sample is precisely weighed, placed on a platinum evaporating dish whose weight has been made constant, carbonized using an electric heater, and then heated using a gas burner until smoke is no longer generated. Furthermore, the platinum evaporating dish is placed in an electric furnace, and the temperature is raised to completely ash the sample. After the ashed sample is cooled, hydrochloric acid and pure water are added thereto, and the ashed sample is dissolved by being heated using an electric heater. The obtained solution is poured into a measuring flask, pure water is added to make the volume constant, and thus a sample for atomic absorption spectrometry is obtained. By performing quantitative analysis using atomic absorption spectrometry for the amount of metal contained in the sample for atomic absorption spectrometry, the content of the aliphatic carboxylic acid metal salt (F) in terms of metal ion can be obtained.

[Content of Aliphatic Carboxylic Acid (E) in Terms of Carboxylic Acid Ion]

The total sum (ex) of the content of the aliphatic carboxylic acid (E) and the content of the metal salt thereof (F) in terms of carboxylic acid ion in the resin composition is determined using liquid chromatography mass spectrometry (LC/MS), gas chromatography mass spectrometry (GC/MS), or the like. Thereafter, the content (ey) of the aliphatic carboxylic acid metal salt (F) in terms of carboxylic acid ion is calculated from the above-described content of the aliphatic carboxylic acid metal salt (F) in terms of metal ion. Then, the content of the aliphatic carboxylic acid (E) in terms of carboxylic acid ion is determined based on a difference ((ex)-(ey)) between the total sum (ex) of the content of the aliphatic carboxylic acid (E) and the content of the metal salt thereof (F) in terms of carboxylic acid ion and the content (ey) of the aliphatic carboxylic acid metal salt (F) in terms of carboxylic acid ion.

In the resin composition of the present disclosure, the weight ratio of the content of the aliphatic carboxylic acid metal salt (F) in terms of metal ion to the content of the aliphatic carboxylic acid (E) in terms of carboxylic acid ion (content of (F) in terms of metal ion/content of (E) in terms of carboxylic acid ion) is typically preferably $0.11 \leq ((F)/(E)) \leq 100$, more preferably $0.13 \leq ((F)/(E)) \leq 90$, further preferably $0.15 \leq ((F)/(E)) \leq 80$, and particularly preferably $0.2 \leq ((F)/(E)) \leq 70$. When the weight ratio is within the above range, the effects of the present disclosure tend to be exhibited more remarkably. When the weight ratio is lower than the above range, the effects of the present disclosure tend not to be sufficiently achieved. When the weight ratio is higher than the above range, moldability tends to be insufficient.

Although reasons are not clear as to why excellent effects can be obtained by setting the ratio ((F)/(E)) between the content of the aliphatic carboxylic acid (E) and the content of the aliphatic carboxylic acid metal salt (F) so as to fall within the above range, dispersibility and thermal stability of the aliphatic carboxylic acid metal salt (F) are enhanced when the aliphatic carboxylic acid (E) and the aliphatic carboxylic acid metal salt (F) of which the anion species is the same species as the aliphatic carboxylic acid (E) are used at a specific ratio. On the other hand, it is presumed that when the content of the aliphatic carboxylic acid (E) is too large, the aliphatic carboxylic acid (E) itself acts as a plasticizer, and accordingly, the effects of the present disclosure (effect of improving mechanical strength) cannot be sufficiently achieved.

[Other Thermoplastic Resin]

The resin composition according to the present disclosure may contain a thermoplastic resin other than the thermoplastic resin (A), the thermoplastic resin (B), and the EVOH (C) within a range (e.g., 30 wt. % or less, or preferably 10 wt. % or less with respect to the total sum of the contents of the resin composition) in which the effects of the present disclosure are not hindered. It is possible to further increase the strength or impart other functions by adding the other thermoplastic resin.

Examples of the other thermoplastic resin include polyvinyl chloride, polyvinylidene chloride, acrylic resin, polyester elastomer, polyurethane elastomer, halogenated polyolefins such as chlorinated polyethylene and chlorinated polypropylene, aromatic polyketones, and aliphatic polyketones. Any one of these may be used alone or two or more of these may be used in combination.

<Other Additives>

The resin composition according to the present disclosure may contain known additives that are commonly contained in resin compositions, such as a thermal stabilizer, an inorganic filler, an antioxidant, an antistatic agent, a colorant, a UV absorbing agent, a lubricant (e.g., saturated aliphatic amide such as stearic acid amide, unsaturated fatty acid amide such as oleic acid amide, or bis fatty acid amide such as ethylenebis stearic acid amide), a plasticizer (e.g., aliphatic polyalcohol such as ethylene glycol, glycerin, or hexane diol), a photostabilizer, a surfactant, an antibacterial agent, a drying agent, an antiblocking agent, a flame retardant, a crosslinking agent, a foaming agent, a nucleating agent, an antifogging agent, an additive for biodegradation, a silane coupling agent, an oxygen absorber, phosphoric acid and/or a salt thereof, cinnamic acid and/or a salt thereof, a conjugated polyene compound, an endiol group-containing substance (e.g., phenols such as propyl gallate), and an aldehyde compound (e.g., unsaturated aldehydes such as croton aldehyde) within a range (e.g., typically 30 wt. % or less, or preferably 10 wt. % or less with respect to the resin composition) in which the effects of the present disclosure are not hindered. Any one of these may be used alone or two or more of these may be used in combination.

Examples of the inorganic filler include a hydrotalcite compound, mica, talc, calcium carbonate, titanium oxide, kaoline, clay, glass flake, glass bead, vermiculite, and smectite. Any one of these may be used alone or two or more of these may be used in combination.

An example of the hydrotalcite compound is a hydrotalcite solid solution represented by the following general formula (1).

$$[(M_1^{2+})_{y1}(M_2^{2+})_{y2}]_{1-x}M_x^{3+}(OH)_2A^{n-}_{x/n} \cdot mH_2O \qquad (1)$$

[In the above formula, $M_1^{2+}$ is at least one metal selected from the group consisting of Mg, Ca, Sr, and Ba, $M_2^{2+}$ is at least one metal selected from the group consisting of Zn, Cd, Pb, and Sn, $M_x^{3+}$ is a trivalent metal, $A^{n-}$ is an n-valent anion, and x, y1, y2, and m are positive numbers satisfying $0 < x \leq 0.5$, $0.5 < y1 < 1$, $y1+y2=1$, and $0 \leq m < 2$.]

In the general formula (1), $M_1^{2+}$ is preferably Mg or Ca, and $M_2^{2+}$ is preferably Zn or Cd. Examples of $M_x^{3+}$ include Al, Bi, In, Sb, B, Ga, and Ti. Any one of these may be used alone or two or more of these may be used in combination, but particularly, the use of Al is practical. Also, examples of $A^{n-}$ in the general formula (1) include $CO_3^{2-}$, $OH^-$, $HCO_3^-$, salicylic acid ion, citric acid ion, tartaric acid ion, $NO_3^-$, $I^-$, $(OOC-COO)^{2-}$, $ClO_4^-$, $CH_3COO^-$, $(OOCHC=CHCOO)^{2-}$, and $[Fe(CN)_6]^{4-}$. Any one of these may be used alone or two or more of these may be used in combination, but particularly $CO_3^{2-}$ and $OH^-$ are useful.

Specific examples of the hydrotalcite solid solution include $[Mg_{0.75}Zn_{0.25}]_{0.67}Al_{0.33}(OH)_2(CO_3)_{0.165} \cdot 0.45H_2O$, $[Mg_{0.79}Zn_{0.21}]_{0.7}Al_{0.3}(OH)_2(CO_3)_{0.15}$, 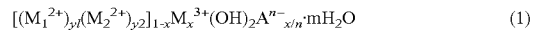 $[Mg_{1/7}Ca_{3/7}Zn_{3/7}]_{0.7}Al_{0.3}(OH)_2(OOCHC=CHCOO)_{0.15} \cdot 0.41H_2O$, $[Mg_{6/7}Cd1/7]_{0.7}Al_{0.3}(OH)_2(CH3COO)_{0.3} \; 0.34H_2O$, $[Mg_{5/7}Pd_{2/7}]_{0.7}Al_{0.30}(OH)_2(C_3)_{0.15}$ $0.52H_2O$,
$[Mg_{0.74}Zn0.26]_{0.68}Al_{0.32}(OH)_2(CO_3)_{0.16}$,
$[Mg_{0.56}Zn0.44]_{0.68}Al_{0.32}(OH)_2(CO_3)_{0.16} \cdot 0.2H_2O$,
$[Mg_{0.81}Zn_{0.19}]_{0.74}Al_{0.26}(OH)_2(CO_3)$ $0.13$,
$[Mg_{0.75}Zn_{0.25}]_{0.8}Al_{0.20}(OH)_2(CO_3)_{0.10} \cdot 0.16H_2O$,
$[Mg_{0.71}Zn_{0.29}]_{0.7}Al_{0.30}(OH)_2(NO_3)_{0.30}$,
$[Mg_{0.71}Zn0.29]0.7Al_{0.30}(OH)_2(OOCHC=CHCOO)_{0.15}$. and
$[Mg_{0.14}Ca_{0.57}Zn_{0.28}]_{0.7}Al_{0.30}(OH)_{2.3} \cdot 0.25H_2O$. Of these, $[Mg_{0.75}Zn_{0.25}]_{0.67}Al_{0.33}(OH)_2(CO_3)_{0.165} \cdot 0.45H_2O$, $[Mg_{0.79}Zn_{0.21}]_{0.7}Al_{0.3}(OH)_2(CO_3)_{0.15}$.

$[Mg_{6/7}Cd_{1/7}]_{0.7}Al_{0.3}(OH)_2(CH_3COO)_{0.3} \cdot 0.34H_2O$, and $[Mg_{5/7}Pd_{2/7}]_{0.7}Al_{0.30}(OH))_2(CO_3)_{0.15} \cdot 0.52H_2O$ are preferable, for example.

In addition to the above, examples of the hydrotalcite compound also include a compound represented by the following general formula (2).

$$M_xAl_y(OH)_{2x+3y-2z}(E)_z \cdot aH_2O \qquad (2)$$

[In the above formula, M is Mg, Ca, or Zn, E is $CO_3$ or $HPO_4$, x, y, and z are positive numbers, and a is 0 or a positive number.]

Specific examples of the compound represented by the general formula (2) include $Mg_{4.5}Al_2(OH)_{13}CO_3 \cdot 3.5H_2O$, $Mg_5Al_2(OH)_{14}CO_3 \cdot 4H_2O$, $Mg_6Al_2(OH)_{16}CO_3 \cdot 4H_2O$, $Mg_8Al_2(OH)_{20}CO_3 \cdot 3.5H_2O$, $Mg_{10}Al_2(OH)_{22}(CO_3)_2 \cdot 4H_2O$, $Mg_6Al_2(OH)_{16}HPO_4 \cdot 4H_2O$, $Ca_6Al_2(OH)_{16}CO_3 \cdot 4H_2O$, and $Zn_6Al_6(OH)_{16}CO_3 \cdot 4H_2O$. There is no limitation to the examples listed above, and it can be expected that equivalent effects will be achieved with the use of a compound for which a chemical formula is not explicitly shown, such as a compound obtained by substituting some OH in $Mg_2Al(OH)_9 \cdot 3H_2O$ with $CO_3$ or $HPO_4$, or removing crystal water (a=0). Of these, a compound for which M is Mg and E is $CO_3$ is particularly preferable from the viewpoint of adaptability to recycling.

As for the particle diameter of the hydrotalcite compound, an average particle diameter is typically 10 μm or less, more preferably 5 μm or less, and particularly preferably 1 μm or less, for example. That is, when the average particle diameter is too large, the effects of the present disclosure tend not to be sufficiently achieved. Note that the average particle diameter mentioned here is a value measured using the LUZEX method.

Of the hydrotalcites described above, a hydrotalcite solid solution represented by the above general formula (1) is particularly preferably used from the viewpoint of achieving high molding stability.

The average particle diameter of the inorganic filler other than the hydrotalcite compound is typically preferably 1 to 20 μm, more preferably 3 to 18 μm, and particularly preferably 5 to 15 μm. When the average particle diameter is less than 1 μm, gel is generated in a molded object due to agglomeration of the particles, and heat resistant stiffness of a laminate structure becomes insufficient. When the average particle diameter is more than 20 μm, it becomes difficult to suppress an increase in resin pressure.

The content of the inorganic filler is typically preferably 0.001 to 30 wt. %, more preferably 0.005 to 20 wt. %, and particularly preferably 0.01 to 10 wt. % with respect to the total sum of the contents of the resin composition.

Examples of the antioxidant include: hindered phenol compounds: dibutyl hydroxytoluene, 2,5-di-t-butyl hydroquinone, 2,6-di-t-butyl-p-cresol, 4,4'-thiobis-(6-t-butylphenol), 2,2'-methylene-bis(4-methyl-6-t-butylphenol), tetrakis-[methylene-3-(3',5'-di-t-butyl-4'-hydroxyphenyl) propionate]methane, N,N'-hexamethylene-bis(3,5-di-t-butyl-4'-hydroxy-hydrocinnamide), 1,3,5-trimethyl-2,4,6 tris(3,5-di-t-butyl-4-hydroxybenzyl)benzene, pentaerythritol-tetrakis[3-(3,5-di-t-butyl-4-hydroxyphenyl)propionate, triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, 2,2-thiodiethylenebis[3-(3,5-di-t-butyl-4-hydroxyphenyl) propionate], octadecyl-3-(3,5-di-t-butyl-4-hydroxyphenyl) propionate, 3,5-di-t-butyl-4-hydroxy-benzylphosphonate-diethylester, bis(3,5-di-t-butyl-4-hydroxybenzylphosphonic acid ethyl)calcium, tris-(3,5-di-t-butyl-4-hydroxybenzyl)-isocyanurate, 2,4-bis[(octylthio)methyl]-o-cresol, isooctyl-3-(3,5-di-t-butyl-4-hydroxyphenyl)propionate], n-octadecyl-3-(3,5-di-t-butyl-4-hydroxyphenyl)propionate, 2-t-butyl-6-(3-t-butyl-2-hydroxy-5-methylbenzyl)-4-methylphenylacrylate, 2-[1-(2-hydroxy-3,5-di-t-pentylphenyl)ethyl]-4,6-di-t-pentylphenylacrylate, 4,4f-butylidenebis(3-methyl-6-t-butylphenol), 4,4'-thiobis(3-methyl-6-t-butylphenol), 3,9-bis{2-[3-(3-t-butyl-4-hydroxy-5-methylphenyl)-propionyloxy]-1,1-dimethylethyl}-2,4,8,10-tetraoxaspiro(5.5)undecane, etc.; phosphite compounds: triaryl phosphite such as triphenyl phosphite, tris(p-nonylphenyl)phosphite, and tris(2,4-di-t-butylphenyl)phosphite, alkylaryl phosphite including mono-alkyldiphenyl phosphite such as diphenyl isooctyl phosphite and diphenyl isodecyl phosphite and dialkylmonophenyl phosphite such as phenyl diisooctyl phosphite and phenyl diisodecyl phosphite, trialkyl phosphite such as triisooctyl phosphite and tristearyl phosphite, and bis(2,4-di-t-butylphenyl)pentaerythritol-di-phosphite; thioether compounds: pentaerythritol-tetrakis-(β-laurylthiopropionate), tetrakis[methylene-3-(dodecylthio)propionate]methane, bis [2-methyl-4-{3-n-alkylthiopropionyloxy}-5-t-butylphenyl] sulfide, dilauryl-3,3'-thiodipropionate, dimistryl-3,3'-thiodipropionate, distearyl-3,3'-thiodipropionate, pentaerythryl-tetrakis(β-laurylthiopropionate), ditridecyl-3,3'-thiodipropionate, 2-mercaptobenzimidazole, etc.; hindered amine compounds: dimethyl succinate.1-(2-hydroxyethyl)-4-hydroxy-2,2,6,6-tetramethylpiperidine polycondensate, poly{[6-(1,1,3,3-tetramethylbutyl)amino-1,3,5-triazine-2,4-diyl][(2,2,6,6-tetramethyl-4-piperidyl)imino]hexamethylene [(2,2,6,6-tetramethyl-4-piperidyl)imino]}, N,N'-bis(3-aminopropyl)ethylenediamine.2,4-bis[N-butyl-N-(1,2,2,6, 6-pentamethyl-4-piperidyl)amino]-6-chloro-1,3,5-triazine condensate, bis(2,2,6,6-tetramethyl-4-piperidyl)sebacate, bis(1,2,2,6,6-pentamethyl-4-piperidinyl)sebacate, 2-(3,5-di-t-butyl-4-hydroxybenzyl)-2-n-butyl malonic acid bis(1,2,2, 6,6-pentamethyl-4-piperidyl, etc.; benzotriazole compounds: 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl) benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl) benzotriazole, 2-(2'-hydroxy-5'-t-octylphenyl)benzotriazole, methyl-3-[3-t-butyl-5-(2H-benzotriazole-2-yl)-4-hydroxyphenyl]propionate-polyethylene glycol condensate, hydroxyphenyl benzotriazole derivative, 2-[2-hydroxy-3-(3, 4,5,6-tetra-hydrophthalimide-methyl)-5-methylphenyl]benzotriazole, etc.; and benzophenone compounds: 2-hydroxy-4-methoxybenzophenone, 2-hydroxy-4-octyloxybenzophenone, 2,2',4,4'-tetrahydroxybenzophenone, etc. One or more of these can be selected. The antioxidant may be used in any form such as powder, granule, liquid, paste, or emulsion.

Of these, hindered phenol antioxidants are preferable, and pentaerythritol-tetrakis-3-(3,5-di-t-butyl-4-hydroxyphenyl) propionate and octadecyl-3-(3,5-di-t-butyl-4-hydroxyphenyl)propionate are superior in an effect of suppressing thermal degradation of the resin composition of the present disclosure, and thus preferably used.

The content of the antioxidant is typically 0.001 to 10 wt. %, preferably 0.005 to 5 wt. %, and particularly preferably 0.01 to 3 wt. % with respect to the total sum of the contents of the resin composition.

Specific examples of phosphoric acid and/or a salt thereof mentioned above include phosphoric acid, sodium dihydrogen phosphate, disodium hydrogen phosphate, potassium dihydrogen phosphate, dipotassium hydrogen phosphate, tripotassium phosphate, calcium hydrogen phosphate, calcium dihydrogen phosphate, tricalcium phosphate, magnesium phosphate, magnesium hydrogen phosphate, magnesium dihydrogen phosphate, zinc hydrogen phosphate, barium hydrogen phosphate, and manganese hydrogen phosphate. Any one of these may be used alone or two or more of these may be used in combination. Of these, phosphoric acid, sodium dihydrogen phosphate, potassium dihydrogen phosphate, calcium dihydrogen phosphate, magnesium dihydrogen phosphate, and zinc hydrogen phosphate are preferable, phosphoric acid, sodium dihydrogen phosphate, calcium dihydrogen phosphate, and magnesium dihydrogen phosphate are more preferable, and phosphoric acid is particularly preferable.

The content of phosphoric acid and/or a salt thereof is typically preferably 0.001 to 300 ppm, more preferably 0.005 to 200 ppm, and further preferably 0.01 to 100 ppm with respect to the total sum of the contents of the resin composition.

Specific examples of cinnamic acid and/or a salt thereof mentioned above include cis-cinnamic acid and trans-cinnamic acid, and trans-cinnamic acid is preferably used from the viewpoint of stability and cost. Examples of cinnamic acid salts include: cinnamic acid alkali metal salts such as lithium cinnamate, sodium cinnamate, and potassium cinnamate; and cinnamic acid alkaline earth metal salts such as magnesium cinnamate, calcium cinnamate, and barium cinnamate. Any one of these cinnamic acids and/or salts thereof may be used alone or two or more of them may be used in combination. It is particularly preferable to use trans-cinnamic acid alone.

The content of cinnamic acid and/or a salt thereof is typically 0.1 to 120 ppm, preferably 0.1 to 100 ppm, more preferably 1 to 80 ppm, and further preferably 1.5 to 50 ppm with respect to the total sum of the contents of the resin composition.

The conjugated polyene compound mentioned above is a compound that has so-called conjugated double bonds with a structure in which a carbon-carbon double bond and a carbon-carbon single bond are alternately linked and the number of carbon-carbon double bonds is two or more. The conjugated polyene compound may be a conjugated diene having a structure in which two carbon-carbon double bonds and a carbon-carbon single bond are alternately linked, a conjugated triene having a structure in which three carbon-carbon double bonds and two carbon-carbon single bonds are alternately linked, or a conjugated polyene compound having a structure in which more than three carbon-carbon double bonds and more than two carbon-carbon single bonds are alternately linked. However, when the number of conjugated carbon-carbon double bonds is 8 or more, a molded object may be colored due to the color of the conjugated polyene compound, and therefore, a polyene having 7 or less conjugated carbon-carbon double bonds is preferable. Also, a plurality of sets of the conjugated double bonds including two or more carbon-carbon double bonds may be present in a single molecule without being conjugated with each other. For example, a compound that includes three conjugated trienes in the same molecule, such as tung oil, is also included in the conjugated polyene compound.

Specific examples of the conjugated polyene compound include: conjugated diene compounds having two carbon-carbon double bonds such as isoprene, myrcene, farnesene, cembrene, sorbic acid, sorbic acid ester, sorbic acid salt, and abietic acid; conjugated triene compounds having three carbon-carbon double bonds such as 1,3,5-hexatriene, 2,4,6-octatriene-1-carboxylic acid, eleostearic acid, tung oil, and cholecalciferol; and conjugated polyene compounds having four or more carbon-carbon double bonds such as cyclooctatetraene, 2,4,6,8-decatetraene-1-carboxylic acid, retinol, and retinoic acid. Any one of these conjugated polyene compounds may be used alone or two or more of them may be used in combination.

The content of the conjugated polyene compound is typically preferably 0.001 to 1000 ppm, more preferably 0.01 to 100 ppm, and particularly preferably 0.05 to 50 ppm with respect to the total sum of the contents of the resin composition.

<Method for Manufacturing Resin Composition>

Although there is no particular limitation on the method for manufacturing the resin composition of the present disclosure, examples of the method include the following methods (I) to (IV). Two or more of the following methods (I) to (IV) may be used in combination.

(I) A method of dry-blending at least one of the thermoplastic resin (B), the EVOH (C), acetic acid and/or a salt thereof (D), the aliphatic carboxylic acid (E), and the aliphatic carboxylic acid metal salt (F) with pellets of the thermoplastic resin (A) at a predetermined ratio (dry blending method).

(II) A method of immersing pellets of at least one of the thermoplastic resin (A), the thermoplastic resin (B), and the EVOH (C) in a solution containing at least one of acetic acid and/or a salt thereof (D), the aliphatic carboxylic acid (E), and the aliphatic carboxylic acid metal salt (F) and then drying the pellets (immersion method).

(III) A method of melt-kneading at least one of the thermoplastic resin (A), the thermoplastic resin (B), the EVOH (C), acetic acid and/or a salt thereof (D), the aliphatic carboxylic acid (E), and the aliphatic carboxylic acid metal salt (F) at a predetermined ratio and then forming pellets (melt-kneading method).

(IV) A method of adding and mixing at least one of acetic acid and/or a salt thereof (D), the aliphatic carboxylic acid (E), and the aliphatic carboxylic acid metal salt (F) into a solution containing pellets of at least one of the thermoplastic resin (A), the thermoplastic resin (B), and the EVOH (C) and then removing a solvent in the solution (solution mixing method).

Of these, the method (III) (melt-kneading method) of melt-kneading at least one of the thermoplastic resin (A), the thermoplastic resin (B), the EVOH (C), acetic acid and/or a salt thereof (D), the aliphatic carboxylic acid (E), and the aliphatic carboxylic acid metal salt (F) at a predetermined ratio and then forming pellets is practical in terms of productivity and economic efficiency and is industrially preferable. In a case where the other thermoplastic resin and additives described above are blended, a resin composition containing the other thermoplastic resin and additives can be obtained using methods similar to the methods (I) to (IV) described above.

As a dry-blending means used in the method (I), a known mixing device such as a rocking mixer, a ribbon blender, or a line mixer may be used, for example.

When dry-blending is to be performed in the method (I), it is preferable to adjust the water content of pellets of at least one of the thermoplastic resin (A), the thermoplastic resin (B), and the EVOH (C) to 0.1 to 5 wt. % (more preferably, 0.5 to 4 wt. %, and particularly preferably 1 to 3 wt. %) to improve adhesion of at least one of acetic acid and/or a salt thereof (D), the aliphatic carboxylic acid (E), and the aliphatic carboxylic acid metal salt (F) to the pellets. When the water content is too low, the at least one of acetic acid and/or a salt thereof (D), the aliphatic carboxylic acid (E), and the aliphatic carboxylic acid metal salt (F) is likely to fall off and an adhesion distribution tends to be nonuniform. Conversely, when the water content is too high, the at least one of acetic acid and/or a salt thereof (D), the aliphatic carboxylic acid (E), and the aliphatic carboxylic acid metal salt (F) tends to agglomerate and the adhesion distribution tends to be nonuniform.

The water content of pellets of at least one of the thermoplastic resin (A), the thermoplastic resin (B), and the EVOH (C) is measured and calculated using the following method.

[Method for Measuring Water Content]

Pellets of at least one of the thermoplastic resin (A), the thermoplastic resin (B), and the EVOH (C) are weighed (W1, unit: g) using an electronic balance, then placed in a hot-air oven-type drier kept at 150° C. for 5 hours to be dried, and further weighed (W2, unit: g) in the same manner after being cooled in a desiccator for 30 minutes, and the water content is calculated using the following formula.

Water content (%)={(W1−W2)/W1}×100

In the methods (I) and (II) described above, pellets of at least one of the thermoplastic resin (A), the thermoplastic resin (B), and the EVOH (C) are obtained with at least one of acetic acid and/or a salt thereof (D), the aliphatic carboxylic acid (E), and the aliphatic carboxylic acid metal salt (F) attached to outer surfaces of the pellets.

As a melt-kneading means used in the method (III) described above, it is possible to use a known melt-kneading device such as a kneader, a ruder, an extruder, a mixing roll, a Banbury mixer, or a plastomill, and the melt-kneading is typically preferably performed at 150° C. to 300° C. (more preferably 180° C. to 280° C.) for about 1 to 20 minutes. In particular, it is industrially advantageous to use a single-screw or twin-screw extruder from the viewpoint of easily obtaining pellets, and it is also preferable to provide a vent suction device, a gear pump device, a screen device, or the like as necessary. In particular, when one or more vent holes are provided in the extruder and suction is performed under reduced pressure to remove moisture and byproducts (e.g., a thermally decomposed low-molecular weight substance), or inert gas such as nitrogen is continuously supplied into a hopper to prevent oxygen from entering the extruder, it is possible to suppress thermal coloration and thermal degradation and obtain a very high quality resin composition.

There is no particular limitation on the method for supplying the materials to the melt-kneading device such as the extruder, and the following methods may be used, for example.

1) A method of dry-blending the thermoplastic resin (A), the thermoplastic resin (B), the EVOH (C), acetic acid and/or a salt thereof (D), the aliphatic carboxylic acid (E), and the aliphatic carboxylic acid metal salt (F) and supplying the mixture to the extruder at a time.

2) A method of supplying pellets of at least one of the thermoplastic resin (A), the thermoplastic resin (B), and the EVOH (C) to the extruder, melting the pellets, and supplying acetic acid and/or a salt thereof (D), the aliphatic carboxylic acid (E), and the aliphatic carboxylic acid metal salt (F) in solid states (solid side-feed method).

3) A method of supplying pellets of at least one of the thermoplastic resin (A), the thermoplastic resin (B), and the EVOH (C) to the extruder, melting the pellets, and supplying acetic acid and/or a salt thereof (D), the aliphatic carboxylic acid (E), and the aliphatic carboxylic acid metal salt (F) in molten states (melt side-feed method).

Of these, the method 1) is practical in terms of simplicity of the device, cost of the blend, etc.

From the viewpoint of reducing the impact on the environment, the following methods 4) to 6) in which scraps containing a layer made of the thermoplastic resin (A) and a layer made of the EVOH (C) are used as a raw material are also preferable.

4) A method of dry-blending scraps containing a layer made of the thermoplastic resin (A) and a layer made of the EVOH (C), the thermoplastic resin (B), acetic acid and/or a salt thereof (D), the aliphatic carboxylic acid (E), and the aliphatic carboxylic acid metal salt (F) and supplying the mixture to the extruder at a time.

5) A method of dry-blending pellets obtained by melt-kneading the thermoplastic resin (B), acetic acid and/or a salt thereof (D), the aliphatic carboxylic acid (E), and the aliphatic carboxylic acid metal salt (F) and scraps containing a layer made of the thermoplastic resin (A) and a layer made of the EVOH (C) and supplying the mixture to the extruder at a time.

6) A method of dry-blending scraps containing a layer made of the thermoplastic resin (A), acetic acid and/or a salt thereof (D), the aliphatic carboxylic acid (E), the aliphatic carboxylic acid metal salt (F), and a layer made of the EVOH (C) and the thermoplastic resin (B) and supplying the mixture to the extruder at a time.

Of these, the methods 4) and 6) are practical in terms of simplicity of the device, cost, etc.

The scraps described above are end portions or defective products that are generated and collected when multilayer structures or molded objects are manufactured. Furthermore, the scraps may be multilayer structures that include layers made of collected objects including scraps. That is, it is possible to manufacture multilayer structures and molded objects that include collected object layers made of a resin composition obtained using end portions or defective products generated in the manufacture of multilayer structures and molded objects, collect scraps of the multilayer structures and the molded objects, and use the scraps as a raw material of the resin composition of the present disclosure.

The scraps are preferably pulverized to a suitable size. It is possible to use scraps obtained from multilayer structures and molded objects of one type, or scraps obtained from multilayer structures and molded objects of two or more types.

Furthermore, the scraps may be multilayer structures and molded objects that are disposed of as plastic waste by general consumers. That is, it is possible to collect multilayer structures and molded objects that are disposed of as plastic waste by general consumers, and use the collected scraps of multilayer structures and molded objects as a raw material of the resin composition of the present disclosure.

After melt-kneading, pellets can be obtained using a known method such as a strand cut method or a hot cut method (e.g., an in-air cut method or an under-water cut method). The strand cut method is preferable from the viewpoint of industrial productivity.

A known good solvent may be used as the solvent in the solution mixing method (IV) described above. In particular, a mixed solvent of water and an aliphatic alcohol having 1 to 4 carbon atoms is used as a representative good solvent for the EVOH (C), and a mixed solvent of water and methanol is preferably used. The solution may be heated or pressurized to dissolve the solute, and the concentration of the solution may be set to a suitable value. It is sufficient to blend acetic acid and/or a salt thereof (D), the aliphatic carboxylic acid (E), and the aliphatic carboxylic acid metal salt (F) with a solution or paste in which pellets of at least one of the thermoplastic resin (A), the thermoplastic resin (B), and the EVOH (C) are dissolved. At this time, acetic acid and/or a salt thereof (D), the aliphatic carboxylic acid (E), and the aliphatic carboxylic acid metal salt (F) can be blended in the state of solids, solutions, or dispersions, for example.

After the blending, the uniformly stirred resin composition solution or paste is formed into pellets using any of the known methods described above. The under-water cut method is preferably used from the viewpoint of industrial productivity. The obtained pellets are dried using a known method.

The pellets may have any shape such as a spherical shape, an oval shape, a columnar shape, a cubic shape, or a rectangular parallelepiped shape. Typically, an oval shape or a columnar shape is adopted. In the case of an oval shape, the length of the minor axis is typically 1 to 6 mm, and preferably 2 to 5 mm, and the length of the major axis is typically 1 to 6 mm, and preferably 2 to 5 mm from the viewpoint of convenience when the pellets are used later as a molding material. In the case of a columnar shape, the diameter of a bottom surface is typically 1 to 6 mm, and preferably 2 to 5 mm, and the length is typically 1 to 6 mm, and preferably 2 to 5 mm.

The resin composition according to the present disclosure can be obtained as described above.

<Molded Object>

A molded object according to the present disclosure is melt molded from the resin composition according to the present disclosure.

Although the molded object can be used as is in various shapes (e.g., film, sheet, cup, tray, bottle, tank, pipe, tube, transport pallet, chair, desk, post, etc.), a (heat) stretching treatment is performed as necessary. The stretching treatment may be either uniaxial stretching or biaxial stretching, and the biaxial stretching may be either simultaneous stretching or sequential stretching. It is also possible to use a stretching method of which the stretching ratio is high from among a roll stretching method, a tenter stretching method, a tubular stretching method, a stretch blow molding method, vacuum compressed air forming, and the like. The stretching temperature is typically selected within a range of about 40° C. to 170° C., and preferably 60° C. to 160° C. When the stretching temperature is too low, stretchability tends to be poor, and when the stretching temperature is too high, maintaining a stable stretched state tends to be difficult.

Note that heat setting may be performed after stretching to impart dimensional stability to the molded object. Heat setting can be performed using well-known means. For example, a heat treatment is performed on a multilayer structure (stretched film) stretched as described above typically for about 2 to 600 seconds at 80° C. to 180° C., or preferably 100° C. to 165° C. while the multilayer structure is kept under tension.

Also, in a case where a single-layer stretched film obtained using the resin composition of the present disclosure is to be used as a shrink film, the heat setting is not performed, and a treatment of cooling and setting the stretched film with cold air or the like can be performed to impart a heat shrinking property.

Furthermore, it is also possible to obtain a single-layer container like a cup or a tray from the molded object of the present disclosure. A drawing method is typically used as the method for manufacturing a single-layer container, and specific examples of the method include vacuum forming, compressed air forming, vacuum compressed air forming, and plug-assisted vacuum compressed air forming. Furthermore, a blow molding method is used in a case where a single-layer container like a tube or a bottle is to be obtained from a single-layer parison (a hollow tube-like preformed object that has not been blown), and specific examples of the blow molding method include extrusion blow molding (twin-head type, mold-transfer type, parison shift type, rotary type, accumulator type, horizontal parison type, etc.), cold parison type blow molding, injection blow molding, and biaxial stretching blow molding (extrusion type cold parison biaxial stretching blow molding, injection type cold parison biaxial stretching blow molding, injection molding in-line type biaxial stretching blow molding, etc.). The molded object of the present disclosure may be subjected to a heat treatment, a cooling treatment, a rolling treatment, a printing treatment, a dry laminating treatment, a solution or melt coating treatment, bag-making processing, deep drawing processing, box processing, tube processing, split processing, or the like as necessary.

The thickness of the molded object (including stretched molded object) of the present disclosure is set as appropriate according to the intended use, packaging form, required physical properties, and the like.

The thickness of the molded object (including stretched molded object) of the present disclosure is typically 10 to 500000 μm, preferably 30 to 300000 μm, and particularly preferably 50 to 200000 μm. When the thickness of the molded object is too small, mechanical strength tends to decrease. When the thickness of the molded object is too large, mechanical strength becomes excessively high and extra amounts of raw materials are unnecessarily used, which is not preferable from the viewpoint of economic efficiency.

The molded object according to the present disclosure can be obtained as described above.

<Multilayer Structure>

A multilayer structure according to the present disclosure includes at least one layer that is made of the resin composition of the present disclosure. When the layer made of the resin composition of the present disclosure (hereinafter simply referred to as a "resin composition layer") and other substrates are stacked, it is possible to further increase the strength or impart other functions.

A layer made of an adhesive resin (hereinafter simply referred to as an "adhesive resin layer"), a layer made of a polyamide resin (hereinafter simply referred to as a "polyamide layer"), a layer made of the EVOH (C) (hereinafter simply referred to as an "EVOH layer"), and a layer made of a thermoplastic resin other than the EVOH (hereinafter simply referred to as a "thermoplastic resin layer") are preferably used as the other substrates.

When the resin composition layer according to the present disclosure is denoted by R (R1, R2, ...), the EVOH layer is denoted by α (α1, α2, ...), the adhesive resin layer is denoted by β (β1, β2, ...), the polyamide layer is denoted by γ (γ1, γ2, ...), and the thermoplastic resin layer is denoted by δ (δ1, δ2, ...), the multilayer structure may be constituted by any combination of layers such as δ/R/β/α, α1/R/α2/α3, δ/R/α1/β/α2, δ1/R/α/β/δ2, R1/α1/β/α2/R2, R1/α1/α2/α3/R2, δ1/R1/β1/α/β2/R2/δ2, δ1/R1/β1/α1/α2/α3/β2/R2/δ2, δ1/R1/α1/β/α2/R2/δ2, δ/R/β/α/γ, δ/R/γ/α1/β/α2, δ1/R/γ/α/β/δ2, R1/γ/α1/β/α2/R2, δ1/R1/β1/γ/α/β2/R2/δ2, or δ1/R1/γ1/α1/β/α2/γ2/R2/δ2. The configuration of layers stacked on one side of an EVOH layer (α) and the configuration of layers stacked on the other side of the EVOH layer (α) may be the same as each other (symmetrical) or differ from each other (asymmetrical). Furthermore, the thickness of layers stacked on one side of an EVOH layer (α) and the thickness of layers stacked on the other side of the EVOH layer (α) may be the same as each other (symmetrical) or differ from each other (asymmetrical).

A known polyamide resin can be used as the polyamide resin. Specific examples include homopolymers such as polycaproamide (nylon 6), poly-ω-aminoheptanoic acid (nylon 7), poly-ω-aminononanoic acid (nylon 9), polyundecaneamide (nylon 11), and polylauryl lactam (nylon 12). Of these, polycaproamide (nylon 6) is preferable. Also, examples of copolymerized polyamide resin include: aliphatic polyamide such as polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 108), caprolactam/lauryl lactam copolymer (nylon 6/12), caprolactam/co-aminononanoic acid copolymer (nylon 6/9), caprolactam/hexamethylene diammonium adipate copolymer (nylon 6/66), lauryl lactam/hexamethylene diammonium adipate copolymer (nylon 12/66), ethylenediamine adipamide/hexamethylene diammonium adipate copolymer (nylon 26/66), caprolactam/hexamethylene diammonium adipate/hexamethylene diammonium sebacate copolymer (nylon 66/610), and ethylene ammonium adipate/hexamethylene diammonium adipate/hexamethylene diammonium sebacate copolymer (nylon 6/66/610); aromatic polyamide such as polyhexamethylene isophthalamide, polyhexamethylene terephthalamide, poly-m-xylylene adipamide, hexamethylene isophthalamide/terephthalamide copolymer, poly-p-phenylene terephthalamide, and poly-p-phenylene. 3,4'-diphenyl ether terephthalamide; amorphous polyamide; modified polyamide resin obtained by modifying any of these polyamide resins with aromatic amine such as methylene benzylamine or m-xylenediamine; and m-xylylene diammonium adipate. Alternatively, the polyamide resin may be a terminal-modified polyamide resin obtained by modifying any of these polyamide resins, and is preferably a terminal-modified polyamide resin.

Examples of the thermoplastic resin other than the EVOH include: (unmodified) polyolefin resin including polyethylene resin such as linear low-density polyethylene, low-density polyethylene, very-low-density polyethylene, medium-density polyethylene, high-density polyethylene, ethylene-propylene (block and random) copolymers, and ethylene-α-olefin (α-olefin having 4 to 20 carbon atoms) copolymer, polypropylene resin such as polypropylene and propylene-α-olefin (α-olefin having 4 to 20 carbon atoms) copolymer, polybutene, polypentene, and polycyclic olefin resin (polymer having a cyclic olefin structure at the main chain and/or a side chain); polyolefin resin in a broad sense including modified olefin resin such as unsaturated carboxylic acid-modified polyolefin resin obtained through graft modification of any of the aforementioned polyolefins with an unsaturated carboxylic acid or an ester thereof; ionomer, ethylene-vinyl acetate copolymer, ethylene-acrylic acid copolymer, ethylene-acrylic acid ester copolymer, polyester resin, polyvinyl chloride, polyvinylidene chloride, acrylic resin, polystyrene resin, vinylester resin, polyester elastomer, polyurethane elastomer, halogenated polyolefins such as chlorinated polyethylene and chlorinated polypropylene, aromatic polyketones, and aliphatic polyketones. Any one of these may be used alone or two or more of these may be used in combination.

Of these, polyolefin resin, polyester resin, and polystyrene resin, which are hydrophobic resins, are preferable from the viewpoint of hydrophobicity, and polyolefin resin such as polyethylene resin, polypropylene resin, polycyclic olefin resin, and these polyolefin resins modified with an unsaturated carboxylic acid are more preferable, and polycyclic olefin resin is particularly preferably used as a hydrophobic resin.

Ethylene and α-olefin in the polyolefin resin may be plant-derived ethylene and α-olefin that are derived from bioethanol, petroleum-derived ethylene and α-olefin that are not derived from plants, or a combination of these two types. Various petroleum-derived α-olefins are available, and accordingly, it is possible to easily adjust physical properties or the like of the polyolefin resin by manufacturing the polyolefin resin using those α-olefins. When plant-derived ethylene and α-olefin are used, the biomass degree of a final product can be further increased to reduce the impact on the environment.

The plant-derived ethylene and α-olefin can be manufactured using a conventionally used method by fermenting a sugar solution or starch obtained from plants such as sugar cane, corn, or sweet potato using microorganisms such as yeast to produce bioethanol, heating the bioethanol in the presence of a catalyst, and causing an intramolecular dehydration reaction or the like to obtain plant-derived ethylene or α-olefin (1-butene, 1-hexene, etc.). Then, plant-derived polyethylene resin can be manufactured using the obtained plant-derived ethylene or α-olefin in the same manner as the manufacture of petroleum-derived polyethylene resin.

Methods for manufacturing plant-derived ethylene and α-olefin and plant-derived polyethylene resin are described in detail in JP-A-2011-506628, for example. An example of plant-derived polyethylene resin that is preferably used in the present disclosure is Green PE manufactured by Braskem S. A.

A known adhesive resin may be used as the material for forming the adhesive resin layer, and the adhesive resin can be selected as appropriate according to other thermoplastic resins used as substrates. A representative example of the adhesive resin is a modified polyolefin polymer that contains a carboxy group and is obtained by chemically bonding unsaturated carboxylic acid or an anhydride thereof to polyolefin resin through an addition reaction, a grafting reaction, or the like. Specific examples include maleic anhydride graft-modified polyethylene, maleic anhydride graft-modified polypropylene, maleic anhydride graft-modified ethylene-propylene (block and random) copolymers, maleic anhydride graft-modified ethylene-ethyl acrylate copolymer, maleic anhydride graft-modified ethylene-vinyl acetate copolymer, maleic anhydride-modified polycyclic olefin resin, and maleic anhydride graft-modified polyolefin resin. Any one of these may be used alone or two or more of these may be used in combination.

The content of unsaturated carboxylic acid or an anhydride thereof in the modified polyolefin polymer containing a carboxy group is typically 0.001 to 3 wt. %, preferably 0.01 to 1 wt. %, and particularly preferably 0.03 to 0.5 wt. % with respect to the total weight of the modified polyolefin polymer containing a carboxy group. When the content of unsaturated carboxylic acid or an anhydride thereof (i.e., modification amount) is small, adhesiveness tends to be insufficient. Conversely, when the content is large, a cross-linking reaction is likely to occur and moldability tends to be impaired.

It is also possible to blend an ethylene-vinyl alcohol copolymer, polyisobutylene, a rubber elastomer component such as ethylene-propylene rubber, a resin of a polyolefin resin layer, or the like with the adhesive resin. In particular, it is possible to blend a polyolefin resin other than the polyolefin resin that serves as a base of the adhesive resin.

The adhesive resin layer, the polyamide layer, and the thermoplastic resin layer described above may contain acetic acid and a salt thereof (D), the aliphatic carboxylic acid (E), and the aliphatic carboxylic acid metal salt (F) used in the present disclosure, as well as conventionally-known plasticizer (e.g., ethylene glycol, glycerin, or hexane diol), filler, clay (e.g., montmorillonite), colorant, antioxidant, antistatic agent, lubricant (e.g., alkali metal salt and alkaline earth metal salt of higher fatty acid having 8 to 30 carbon atoms, higher fatty acid ester (e.g., methyl ester, isopropyl ester, butyl ester, octyl ester, etc., of higher fatty acid), higher fatty acid amide (e.g., saturated aliphatic amide such as stearic acid amide and behenic acid amide, unsaturated fatty acid amide such as oleic acid amide and erucic acid amide, bis fatty acid amide such as ethylenebis stearic acid amide, ethylenebis oleic acid amide, ethylenebis erucic acid amide, and ethylenebis lauric acid amide), low-molecular weight polyolefin (e.g., low-molecular weight polyethylene or low-molecular weight polypropylene having a molecular weight of about 500 to 10000), ethylene fluoride resin, etc.), nucleating agent, antiblocking agent, UV absorbing agent, wax, or the like within a range (e.g., 30 wt. % or less, or preferably 10 wt. % or less) in which the gist of the present disclosure is not hindered. Any one of these may be used alone or two or more of these may be used in combination.

It is also preferable to add at least one selected from the group consisting of the thermoplastic resin (A), the thermoplastic resin (B), the EVOH (C), acetic acid and/or a salt thereof (D), the aliphatic carboxylic acid (E), and the aliphatic carboxylic acid metal salt (F) to a resin used for the adhesive resin layer and/or the polyamide layer.

A known method can be used to manufacture the multilayer structure by stacking the resin composition layer and other substrates described above. For example, it is possible to use: a method of laminating other substrates through melt extrusion on a film, sheet, or the like made of the resin composition of the present disclosure; a method of laminating the resin composition of the present disclosure on other substrates through melt extrusion; a method of co-extruding the resin composition of the present disclosure and other substrates; a method of forming a film (layer) of the resin composition of the present disclosure and other substrates (layers) individually, and stacking the film and substrates through dry lamination using a known adhesive agent such as an organic titanium compound, an isocyanate compound, a polyester compound, or a polyurethane compound; or a method of applying a solution of the resin composition of the present disclosure to another substrate and then removing the solvent. Of these, the co-extrusion method is preferable from the viewpoint of cost and consideration for the environment.

The multilayer structure is then subjected to a (heat) stretching treatment as necessary. The stretching treatment may be either uniaxial stretching or biaxial stretching, and the biaxial stretching may be either simultaneous stretching or sequential stretching. It is also possible to use a stretching method of which the stretching ratio is high from among a roll stretching method, a tenter stretching method, a tubular stretching method, a stretch blow molding method, and vacuum compressed air forming, and the like. The stretching temperature is typically selected within a range of about 40° C. to 170° C., and preferably 60° C. to 160° C. When the stretching temperature is too low, stretchability tends to be poor, and when the stretching temperature is too high, it becomes difficult to maintain a stable stretched state.

Note that heat setting may be performed after stretching to impart dimensional stability. Heat setting can be performed using well-known means. For example, a heat treatment is performed on the stretched multilayer structure (stretched film) typically for about 2 to 600 seconds at 80° C. to 180° C., or preferably 100° C. to 165° C. while the multilayer structure is kept under tension.

Also, in a case where a multilayer stretched film obtained using the resin composition of the present disclosure is to be used as a shrink film, the heat setting is not performed, and a treatment of cooling and setting the stretched film with cold air or the like can be performed to impart a heat shrinking property.

Furthermore, in some cases, a multilayer container like a cup or a tray can also be obtained from the multilayer structure of the present disclosure. A drawing method is typically used as the method for manufacturing a multilayer container, and specific examples of the method include vacuum forming, compressed air forming, vacuum compressed air forming, and plug-assisted vacuum compressed air forming. Furthermore, a blow molding method is used in a case where a multilayer container like a tube or a bottle is to be obtained from a multilayer parison (a hollow tube-like preformed object that has not been blown), and specific examples of the blow molding method include extrusion blow molding (twin-head type, mold-transfer type, parison shift type, rotary type, accumulator type, horizontal parison type, etc.), cold parison type blow molding, injection blow molding, and biaxial stretching blow molding (extrusion type cold parison biaxial stretching blow molding, injection type cold parison biaxial stretching blow molding, injection molding in-line type biaxial stretching blow molding, etc.). The multilayer laminate of the present disclosure may be subjected to a heat treatment, a cooling treatment, a rolling treatment, a printing treatment, a dry laminating treatment, a solution or melt coating treatment, bag-making processing, deep drawing processing, box processing, tube processing, split processing, or the like as necessary.

The thickness of the multilayer structure (including stretched multilayer structure) of the present disclosure and thicknesses of the resin composition layer, the EVOH layer, the polyamide resin layer, the adhesive resin layer, and the other thermoplastic resin layer, which constitute the multilayer structure, are set as appropriate according to the layer configuration, types of thermoplastic resins, the type of polyamide resin, the type of adhesive resin, the intended use, packaging form, required physical properties, and the like.

The total thickness of the multilayer structure (including stretched multilayer structure) of the present disclosure is typically 10 to 5000 µm, preferably 30 to 3000 µm, and particularly preferably 50 to 2000 µm. When the total thickness of the multilayer structure is too small, gas barrier properties and mechanical strength may be degraded. When the total thickness of the multilayer structure is too large, gas barrier properties and mechanical strength become excessively high and extra amounts of raw materials are unnecessarily used, and accordingly, economic efficiency tends to be low. The resin composition layer (R) typically has a thickness of 5 to 3000 µm, preferably 10 to 2000 µm, and particularly preferably 20 to 1000 µm. The EVOH layer (α) typically has a thickness of 1 to 500 µm, preferably 3 to 300 µm, and particularly preferably 5 to 200 µm. The thermoplastic resin layer (δ) typically has a thickness of 5 to 3000 µm, preferably 10 to 2000 µm, and particularly preferably 20 to 1000 µm. The adhesive resin layer (β) typically has a thickness of 0.5 to 250 µm, preferably 1 to 150 µm, and particularly preferably 3 to 100 µm. In a case where the multilayer structure includes two or more layers of the same type that is at least one of the resin composition layer (R), the EVOH layer (α), the adhesive resin layer (β), and the thermoplastic resin layer (δ), the above values indicate the total thickness of the layers of the same type.

A ratio of the thickness of the EVOH layer (a) to the thickness of the resin composition layer (R) (EVOH layer (α)/resin composition layer (R)) in the multilayer structure is typically 1/99 to 50/50, preferably 2/98 to 45/55, more preferably 5/95 to 40/60, and particularly preferably 10/90 to 35/65, each of the thicknesses being the thickness of the thickest layer among layers of the same type. When the ratio is within the above range, the effects of the present disclosure tend to be exhibited more remarkably. When the ratio is lower than the above range, gas barrier properties and mechanical strength tend to be insufficient. When the ratio is higher than the above range, the multilayer structure tends to be liable to cracking.

A ratio of the thickness of the EVOH layer (α) to the thickness of the polyamide layer (γ) (EVOH layer (α)/polyamide layer (γ)) in the multilayer structure is typically 10/90 to 99/1, preferably 20/80 to 80/20, and particularly preferably 40/60 to 60/40, each of the thicknesses being the thickness of the thickest layer among layers of the same type. When the ratio is within the above range, the effects of the present disclosure tend to be exhibited more remarkably. When the ratio is lower than the above range, gas barrier properties tend to be insufficient. When the ratio is higher than the above range, mechanical strength tends to be insufficient.

A ratio of the thickness of the EVOH layer (α) to the thickness of the adhesive resin layer (β) (EVOH layer (α)/adhesive resin layer (β)) in the multilayer structure is typically 10/90 to 99/1, preferably 20/80 to 95/5, and particularly preferably 50/50 to 90/10, each of the thicknesses being the thickness of the thickest layer among layers of the same type. When the ratio is within the above range, the effects of the present disclosure tend to be exhibited more remarkably. When the ratio is lower than the above range, gas barrier properties tend to be insufficient. When the ratio is higher than the above range, adhesive strength tends to be insufficient.

The multilayer structure including the layer made of the resin composition is useful as a raw material of various packaging bodies for general foods, condiments such as mayonnaise and dressings, fermented foods such as soybean paste, oil and fat foods such as salad oil, beverages, cosmetics, medicines, and the like.

EXAMPLES

The following describes the present disclosure more specifically using examples, but embodiments of the present disclosure are not limited to the following examples so long as such embodiments do not depart from the gist of the present disclosure.

The following components were prepared in advance of examples.

[Thermoplastic Resin (A)]
Polypropylene (a1) ("EA7AD" manufactured by Japan Polypropylene Corporation, MFR: 1.4 g/10 minutes [at 230° C. and a load of 2160 g])

[Thermoplastic Resin (B)]
Maleic anhydride graft-modified polypropylene (b1) ("PLEXAR PX6002" manufactured by LyondellBasell, MFR: 2.3 g/10 minutes [at 230° C. and a load of 2160 g])
Polyvinyl acetate resin (b2) (obtained by melt-kneading an ethylene-vinyl acetate copolymer (b3) ["ULTRATHENE 3B53A" manufactured by Tosoh Corporation, vinyl acetate content: 28 wt. %, MFR: 5.7 g/10 minutes (at 190° C. and a load of 2160 g)] and a saponified ethylene-vinyl acetate copolymer (b4) ["MELTHENE H0051K" manufactured by Tosoh Corporation, ethylene content: 89 mol %, saponification degree: 99 mol %, MFR: 6.5 g/10 minutes (at 190° C. and a load of 2160 g)] at a weight ratio of (b3)/(b4)=97.8/2.2)

[EVOH (C)]
EVOH (c1) (ethylene structural unit content: 29 mol %, saponification degree: 99.7 mol %, MFR: 3.8 g/10 minutes [at 210° C. and a load of 2160 g])
EVOH (c2) (ethylene structural unit content: 29 mol %, saponification degree: 99.7 mol %, MFR: 8.0 g/10 minutes [at 210° C. and a load of 2160 g])

[Acetic Acid and/or Salt Thereof (D)]
Sodium acetate (d1)

[Aliphatic Carboxylic Acid (E)]
Stearic acid (e1)
Caprylic acid (e2)
Lauric acid (e3)
Behenic acid (e4)

[Aliphatic Carboxylic Acid Metal Salt (F)]
Zinc stearate (f1)
Zinc caprylate (f2)
Zinc laurate (f3)
Zinc behenate (f4)
Magnesium stearate (f5)
Sodium stearate (f6)
Zinc gluconate trihydrate (f7)
Zinc citrate dihydrate (f8)

Example 1

[Manufacture of Resin Composition]

Polypropylene (a1) pellets were used as the thermoplastic resin (A) that does not contain a polar group, maleic anhydride graft-modified polypropylene (b1) pellets were used as the thermoplastic resin (B) containing a polar group, EVOH (c1) pellets were used as the EVOH (C), sodium acetate (d1) was used as acetic acid and/or a salt thereof (D), stearic acid (e1) was used as the aliphatic carboxylic acid (E), and zinc stearate (f1) was used as the aliphatic carboxylic acid metal salt (F).

A resin composition was prepared by dry-blending 94 wt. % of polypropylene (a1) with respect to the total sum of contents of the resin composition, 1 wt. % of maleic anhydride graft-modified polypropylene (b1) with respect to the total sum of the contents of the resin composition, 5 wt. % of the EVOH (c1) with respect to the total sum of the contents of the resin composition, 22 ppm of sodium acetate (d1) in terms of acetic acid ion with respect to the total sum of the contents of the resin composition, 0.02 ppm of stearic acid (e1) in terms of carboxylic acid ion with respect to the total sum of the contents of the resin composition, and 0.5 ppm of zinc stearate (f1) in terms of metal ion with respect to the total sum of the contents of the resin composition, melt-kneading the mixture under the following melt-kneading conditions using a φ 32-mm twin-screw extrusion molding device (L/D=56, molding temperature=210° C.), and again pelletizing the melt-kneaded product.

[Melt-Kneading Conditions for Resin Composition]

Twin-screw extruder: diameter: 32 mm, L/D=56 (manufactured by The Japan Steel Works, Ltd.)

Extruder setting temperature: C2/C3/C4/C5/C6/C7/C8/C9/C10/C11/C12/C13/C14/C15/C16/H/D=100/150/200/210/210/210/210/210/210/210/210/210/210/210/210/210° C.

Screw rotational speed: 330 ppm

Discharge amount: 25 kg/hour

Strand cooling: water cooling

<Evaluation of Mechanical Strength of Resin Composition>

The resin composition manufactured as described above was subjected to heat press forming at 230° C. using a manual hydraulic vacuum heat pressing machine (model MIC-1867) manufactured by Imoto machinery Co., LTD., to obtain a single-layer sheet with a thickness of 1 mm. The obtained single-layer sheet was cut to finally obtain a strip-shaped test piece having a thickness of 1 mm, a width of 15 mm, and a length of 100 mm. The strip-shaped test piece was pinched using a tensile test machine "Autograph AGS-X" manufactured by SHIMADZU CORPORATION at 23° C. and 50%RH with the length between gauge marks set to 50 mm, and a tensile test was carried out at a test speed of 50 mm/min to evaluate the modulus of elasticity and breaking strain. The evaluation was carried out five times, and average values of the modulus of elasticity and the breaking strain were obtained. Higher modulus of elasticity and higher breaking strain indicate further improved mechanical strength of the resin composition.

Example 2

A resin composition was prepared in the same manner as in Example 1 except that stearic acid (e1) was used in an amount of 0.11 ppm in terms of carboxylic acid ion with respect to the total sum of the contents of the resin composition and zinc stearate (f1) was used in an amount of 2.3 ppm in terms of metal ion with respect to the total sum of the contents of the resin composition, and evaluation was carried out in the same manner as in Example 1.

Example 3

A resin composition was prepared in the same manner as in Example 1 except that polypropylene (a1) was used in an amount of 90 wt. % with respect to the total sum of the contents of the resin composition, maleic anhydride graft-modified polypropylene (b1) was used in an amount of 1 wt. % with respect to the total sum of the contents of the resin composition, polyvinyl acetate resin (b2) pellets were further used as the thermoplastic resin (B) in an amount of 4 wt. % with respect to the total sum of the contents of the resin composition, the EVOH (c1) was used in an amount of 5 wt. % with respect to the total sum of the contents of the resin composition, sodium acetate (d1) was used in an amount of 22 ppm in terms of acetic acid ion with respect to the total sum of the contents of the resin composition, stearic acid (e1) was used in an amount of 0.11 ppm in terms of carboxylic acid ion with respect to the total sum of the contents of the resin composition, and zinc stearate (f1) was used in an amount of 2.3 ppm in terms of metal ion with respect to the total sum of the contents of the resin composition. Evaluation was carried out in the same manner as in Example 1.

Example 4

A resin composition was prepared in the same manner as in Example 1 except that stearic acid (e1) was used in an amount of 0.45 ppm in terms of carboxylic acid ion with respect to the total sum of the contents of the resin composition and zinc stearate (f1) was used in an amount of 9.3 ppm in terms of metal ion with respect to the total sum of the contents of the resin composition, and evaluation was carried out in the same manner as in Example 1.

Example 5

A resin composition was prepared in the same manner as in Example 1 except that caprylic acid (e2) was used instead of stearic acid (e1) in an amount of 0.06 ppm in terms of carboxylic acid ion with respect to the total sum of the contents of the resin composition and zinc caprylate (f2) was used instead of zinc stearate (f1) in an amount of 0.5 ppm in terms of metal ion with respect to the total sum of the contents of the resin composition, and evaluation was carried out in the same manner as in Example 1.

Example 6

A resin composition was prepared in the same manner as in Example 5 except that caprylic acid (e2) was used in an amount of 0.31 ppm in terms of carboxylic acid ion with respect to the total sum of the contents of the resin composition and zinc caprylate (f2) was used in an amount of 2.3 ppm in terms of metal ion with respect to the total sum of the contents of the resin composition, and evaluation was carried out in the same manner as in Example 1.

Example 7

A resin composition was prepared in the same manner as in Example 3 except that caprylic acid (e2) was used instead of stearic acid (e1) in an amount of 0.31 ppm in terms of carboxylic acid ion with respect to the total sum of the contents of the resin composition and zinc caprylate (f2) was used instead of zinc stearate (f1) in an amount of 2.3 ppm in terms of metal ion with respect to the total sum of the contents of the resin composition, and evaluation was carried out in the same manner as in Example 1.

Example 8

A resin composition was prepared in the same manner as in Example 5 except that caprylic acid (e2) was used in an amount of 1.28 ppm in terms of carboxylic acid ion with

Example 9

A resin composition was prepared in the same manner as in Example 1 except that lauric acid (e3) was used instead of stearic acid (e1) in an amount of 0.02 ppm in terms of carboxylic acid ion with respect to the total sum of the contents of the resin composition and zinc laurate (f3) was used instead of zinc stearate (f1) in an amount of 0.5 ppm in terms of metal ion with respect to the total sum of the contents of the resin composition, and evaluation was carried out in the same manner as in Example 1.

Example 10

A resin composition was prepared in the same manner as in Example 9 except that lauric acid (e3) was used in an amount of 0.08 ppm in terms of carboxylic acid ion with respect to the total sum of the contents of the resin composition and zinc laurate (f3) was used in an amount of 2.3 ppm in terms of metal ion with respect to the total sum of the contents of the resin composition, and evaluation was carried out in the same manner as in Example 1.

Example 11

A resin composition was prepared in the same manner as in Example 3 except that lauric acid (e3) was used instead of stearic acid (e1) in an amount of 0.08 ppm in terms of carboxylic acid ion with respect to the total sum of the contents of the resin composition and zinc laurate (f3) was used instead of zinc stearate (f1) in an amount of 2.3 ppm in terms of metal ion with respect to the total sum of the contents of the resin composition, and evaluation was carried out in the same manner as in Example 1.

Example 12

A resin composition was prepared in the same manner as in Example 9 except that lauric acid (e3) was used in an amount of 0.33 ppm in terms of carboxylic acid ion with respect to the total sum of the contents of the resin composition and zinc laurate (f3) was used in an amount of 9.3 ppm in terms of metal ion with respect to the total sum of the contents of the resin composition, and evaluation was carried out in the same manner as in Example 1.

Example 13

A resin composition was prepared in the same manner as in Example 1 except that behenic acid (e4) was used instead of stearic acid (e1) in an amount of 0.03 ppm in terms of carboxylic acid ion with respect to the total sum of the contents of the resin composition and zinc behenate (f4) was used instead of zinc stearate (f1) in an amount of 0.5 ppm in terms of metal ion with respect to the total sum of the contents of the resin composition, and evaluation was carried out in the same manner as in Example 1.

Example 14

A resin composition was prepared in the same manner as in Example 13 except that behenic acid (e4) was used in an amount of 0.13 ppm in terms of carboxylic acid ion with respect to the total sum of the contents of the resin composition and zinc behenate (f4) was used in an amount of 2.3 ppm in terms of metal ion with respect to the total sum of the contents of the resin composition, and evaluation was carried out in the same manner as in Example 1.

Example 15

A resin composition was prepared in the same manner as in Example 3 except that behenic acid (e4) was used instead of stearic acid (e1) in an amount of 0.13 ppm in terms of carboxylic acid ion with respect to the total sum of the contents of the resin composition and zinc behenate (f4) was used instead of zinc stearate (f1) in an amount of 2.3 ppm in terms of metal ion with respect to the total sum of the contents of the resin composition, and evaluation was carried out in the same manner as in Example 1.

Example 16

A resin composition was prepared in the same manner as in Example 13 except that behenic acid (e4) was used in an amount of 0.53 ppm in terms of carboxylic acid ion with respect to the total sum of the contents of the resin composition and zinc behenate (f4) was used in an amount of 9.3 ppm in terms of metal ion with respect to the total sum of the contents of the resin composition, and evaluation was carried out in the same manner as in Example 1.

Example 17

A resin composition was prepared in the same manner as in Example 1 except that stearic acid (e1) was used in an amount of 0.69 ppm in terms of carboxylic acid ion with respect to the total sum of the contents of the resin composition and magnesium stearate (f5) was used instead of zinc stearate (f1) in an amount of 2.3 ppm in terms of metal ion with respect to the total sum of the contents of the resin composition, and evaluation was carried out in the same manner as in Example 1.

Example 18

A resin composition was prepared in the same manner as in Example 3 except that stearic acid (e1) was used in an amount of 0.69 ppm in terms of carboxylic acid ion with respect to the total sum of the contents of the resin composition and magnesium stearate (f5) was used instead of zinc stearate (f1) in an amount of 2.3 ppm in terms of metal ion with respect to the total sum of the contents of the resin composition, and evaluation was carried out in the same manner as in Example 1.

Example 19

A resin composition was prepared in the same manner as in Example 1 except that stearic acid (e1) was used in an amount of 0.15 ppm in terms of carboxylic acid ion with respect to the total sum of the contents of the resin composition and sodium stearate (f6) was used instead of zinc stearate (f1) in an amount of 2.3 ppm in terms of metal ion with respect to the total sum of the contents of the resin composition, and evaluation was carried out in the same manner as in Example 1.

Example 20

A resin composition was prepared in the same manner as in Example 3 except that stearic acid (e1) was used in an amount of 0.15 ppm in terms of carboxylic acid ion with respect to the total sum of the contents of the resin composition and sodium stearate (f6) was used instead of zinc stearate (f1) in an amount of 2.3 ppm in terms of metal ion with respect to the total sum of the contents of the resin composition, and evaluation was carried out in the same manner as in Example 1.

Comparative Example 1

A resin composition was prepared in the same manner as in Example 1 except that stearic acid (e1) and zinc stearate (f1) were not used, and evaluation was carried out in the same manner as in Example 1.

Comparative Example 2

A resin composition was prepared in the same manner as in Example 3 except that stearic acid (e1) and zinc stearate (f1) were not used, and evaluation was carried out in the same manner as in Example 1.

Comparative Example 3

A resin composition was prepared in the same manner as in Example 2 except that stearic acid (e1) was not used, and evaluation was carried out in the same manner as in Example 1.

Comparative Example 4

A resin composition was prepared in the same manner as in Example 5 except that polypropylene (a1) was used in an amount of 69 wt. % with respect to the total sum of the contents of the resin composition, the EVOH (c1) was used in an amount of 30 wt. % with respect to the total sum of the contents of the resin composition, sodium acetate (d1) was used in an amount of 130 ppm in terms of acetic acid ion with respect to the total sum of the contents of the resin composition, caprylic acid (e2) was used in an amount of 7.7 ppm in terms of carboxylic acid ion with respect to the total sum of the contents of the resin composition, and zinc caprylate (f2) was used in an amount of 55.8 ppm in terms of metal ion with respect to the total sum of the contents of the resin composition. Evaluation was carried out in the same manner as in Example 1.

Comparative Example 5

A resin composition was prepared in the same manner as in Example 7 except that polypropylene (a1) was used in an amount of 65 wt. % with respect to the total sum of the contents of the resin composition, the EVOH (c1) was used in an amount of 30 wt. % with respect to the total sum of the contents of the resin composition, sodium acetate (d1) was used in an amount of 130 ppm in terms of acetic acid ion with respect to the total sum of the contents of the resin composition, caprylic acid (e2) was used in an amount of 7.7 ppm in terms of carboxylic acid ion with respect to the total sum of the contents of the resin composition, and zinc caprylate (f2) was used in an amount of 55.8 ppm in terms of metal ion with respect to the total sum of the contents of the resin composition. Evaluation was carried out in the same manner as in Example 1.

Comparative Example 6

A resin composition was prepared in the same manner as in Example 1 except that stearic acid (e1) was used in an amount of 0.11 ppm in terms of carboxylic acid ion with respect to the total sum of the contents of the resin composition and zinc gluconate trihydrate (f7) was used instead of zinc stearate (f1) in an amount of 2.3 ppm in terms of metal ion with respect to the total sum of the contents of the resin composition, and evaluation was carried out in the same manner as in Example 1.

Comparative Example 7

A resin composition was prepared in the same manner as in Example 3 except that zinc gluconate trihydrate (f7) was used instead of zinc stearate (f1) in an amount of 2.3 ppm in terms of metal ion with respect to the total sum of the contents of the resin composition, and evaluation was carried out in the same manner as in Example 1.

Comparative Example 8

A resin composition was prepared in the same manner as in Example 1 except that stearic acid (e1) was used in an amount of 0.11 ppm in terms of carboxylic acid ion with respect to the total sum of the contents of the resin composition and zinc citrate dihydrate (f8) was used instead of zinc stearate (f1) in an amount of 2.3 ppm in terms of metal ion with respect to the total sum of the contents of the resin composition, and evaluation was carried out in the same manner as in Example 1.

Comparative Example 9

A resin composition was prepared in the same manner as in Example 6 except that the EVOH (c2) was used instead of the EVOH (c1) and sodium acetate (d1) was not used, and evaluation was carried out in the same manner as in Example 1.

Evaluation results of Examples and Comparative Examples are shown in Tables 1 and 2.

TABLE 1

| | Thermoplastic resin (A) [%] | Thermoplastic resin (B) [%] (type) | EVOH (C) [%] (type) | Acetic acid (D) Content*1 [ppm] | Aliphatic carboxylic acid (E) | | Aliphatic carboxylic acid metal salt (F) | | | | Mechanical strength evaluation | |
|---|---|---|---|---|---|---|---|---|---|---|---|---|
| | | | | | Type | Content*2 [ppm] | Type | Content*3 [ppm] | F/E | F/D | Modulus of elasticity [N/mm²] | Breaking strain (%) |
| Ex. 1 | 94 | 1(b1) | 5(c1) | 22 | Stearic acid | 0.02 | Zinc stearate | 0.5 | 20.6 | 0.022 | 1210 | 731 |
| Ex. 2 | 94 | 1(b1) | 5(c1) | 22 | Stearic acid | 0.11 | Zinc stearate | 2.3 | 20.6 | 0.104 | 1374 | 733 |
| Ex. 3 | 90 | 1(b1) 4(b2) | 5(c1) | 22 | Stearic acid | 0.11 | Zinc stearate | 2.3 | 20.6 | 0.104 | 1212 | 767 |

TABLE 1-continued

| | Thermo-plastic resin (A) [%] | Thermo-plastic resin (B) [%] (type) | EVOH (C) [%] (type) | Acetic acid (D) Content*1 [ppm] | Aliphatic carboxylic acid (E) | | Aliphatic carboxylic acid metal salt (F) | | F/E | F/D | Mechanical strength evaluation | |
|---|---|---|---|---|---|---|---|---|---|---|---|---|
| | | | | | Type | Content*2 [ppm] | Type | Content*3 [ppm] | | | Modulus of elasticity [N/mm²] | Breaking strain (%) |
| Ex. 4 | 94 | 1(b1) | 5(c1) | 22 | Stearic acid | 0.45 | Zinc stearate | 9.3 | 20.6 | 0.431 | 1538 | 745 |
| Ex. 5 | 94 | 1(b1) | 5(c1) | 22 | Caprylic acid | 0.06 | Zinc caprylate | 0.5 | 7.2 | 0.022 | 1049 | 711 |
| Ex. 6 | 94 | 1(b1) | 5(c1) | 22 | Caprylic acid | 0.31 | Zinc caprylate | 2.3 | 7.2 | 0.104 | 1190 | 713 |
| Ex. 7 | 90 | 1(b1) 4(b2) | 5(c1) | 22 | Caprylic acid | 0.31 | Zinc caprylate | 2.3 | 7.2 | 0.104 | 1082 | 721 |
| Ex. 8 | 94 | 1(b1) | 5(c1) | 22 | Caprylic acid | 1.28 | Zinc caprylate | 9.3 | 7.2 | 0.431 | 1333 | 724 |
| Ex. 9 | 94 | 1(b1) | 5(c1) | 22 | Lauric acid | 0.02 | Zinc laurate | 0.5 | 28 | 0.022 | 1099 | 727 |
| Ex. 10 | 94 | 1(b1) | 5(c1) | 22 | Lauric acid | 0.08 | Zinc laurate | 2.3 | 28 | 0.104 | 1248 | 729 |
| Ex. 11 | 90 | 1(b1) 4(b2) | 5(c1) | 22 | Lauric acid | 0.08 | Zinc laurate | 2.3 | 28 | 0.104 | 1209 | 750 |
| Ex. 12 | 94 | 1(b1) | 5(c1) | 22 | Lauric acid | 0.33 | Zinc laurate | 9.3 | 28 | 0.431 | 1397 | 741 |
| Ex. 13 | 94 | 1(b1) | 5(c1) | 22 | Behenic acid | 0.03 | Zinc behenate | 0.5 | 17.5 | 0.022 | 1239 | 751 |
| Ex. 14 | 94 | 1(b1) | 5(c1) | 22 | Behenic acid | 0.13 | Zinc behenate | 2.3 | 17.5 | 0.104 | 1407 | 753 |
| Ex. 15 | 90 | 1(b1) 4(b2) | 5(c1) | 22 | Behenic acid | 0.13 | Zinc behenate | 2.3 | 17.5 | 0.104 | 1216 | 770 |
| Ex. 16 | 94 | 1(b1) | 5(c1) | 22 | Behenic acid | 0.53 | Zinc behenate | 9.3 | 17.5 | 0.431 | 1576 | 766 |
| Ex. 17 | 94 | 1(b1) | 5(c1) | 22 | Stearic acid | 0.69 | Mg stearate | 2.3 | 3.2 | 0.104 | 1358 | 732 |
| Ex. 18 | 90 | 1(b1) 4(b2) | 5(c1) | 22 | Stearic acid | 0.69 | Mg stearate | 2.3 | 3.2 | 0.104 | 1180 | 737 |
| Ex. 19 | 94 | 1(b1) | 5(c1) | 22 | Stearic acid | 0.15 | Na stearate | 2.3 | 14.9 | 0.104 | 1360 | 579 |
| Ex. 20 | 90 | 1(b1) 4(b2) | 5(c1) | 22 | Stearic acid | 0.15 | Na stearate | 2.3 | 14.9 | 0.104 | 1190 | 583 |

*1 content in terms of acetic acid ion,
*2 content in terms of carboxylic acid ion,
*3 content in terms of metal ion

TABLE 2

| | Thermo-plastic resin (A) [%] (type) | Thermo-plastic resin (B) [%] (type) | EVOH (C) [%] | Acetic acid (D) content*1 [ppm] | Aliphatic carboxylic acid (E) | | Aliphatic carboxylic acid metal salt (F) | | F/E | F/D | Mechanical strength evaluation | |
|---|---|---|---|---|---|---|---|---|---|---|---|---|
| | | | | | Type | Content*2 [ppm] | Type | Content*3 [ppm] | | | Modulus of elasticity [N/mm²] | Breaking strain (%) |
| Com. Ex. 1 | 94 | 1(b1) | 5(c1) | 22 | — | 0 | — | 0 | 0 | 0 | 887 | 414 |
| Com. Ex. 2 | 90 | 1(b1) 4(b2) | 5(c1) | 22 | — | 0 | — | 0 | 0 | 0 | 712 | 499 |
| Com. Ex. 3 | 94 | 1(b1) | 5(c1) | 22 | — | 0 | Zinc stearate | 2.3 | ∞ | 0.104 | 1226 | 345 |
| Com. Ex. 4 | 69 | 1(b1) | 30(c1) | 130 | Caprylic acid | 7.7 | Zinc caprylate | 55.8 | 7.2 | 0.431 | 1339 | 23 |
| Com. Ex. 5 | 65 | 1(b1) 4(b2) | 30(c1) | 130 | Caprylic acid | 7.7 | Zinc caprylate | 55.8 | 7.2 | 0.431 | 1303 | 14 |
| Com. Ex. 6 | 94 | 1(b1) | 5(c1) | 22 | Stearic acid | 0.11 | Zinc gluconate trihydrate | 2.3 | 21 | 0.104 | 1204 | 43 |
| Com. Ex. 7 | 90 | 1(b1) 4(b2) | 5(c1) | 22 | Stearic acid | 0.11 | Zinc gluconate trihydrate | 2.3 | 21 | 0.104 | 1065 | 267 |
| Com. Ex. 8 | 94 | 1(b1) | 5(c1) | 22 | Stearic acid | 0.11 | zinc citrate dihydrate | 2.3 | 21 | 0.104 | 1232 | 223 |
| Com. Ex. 9 | 94 | 1(b1) | 5(c2) | 0 | Caprylic acid | 0.31 | Zinc caprylate | 2.3 | 7.2 | ∞ | 1323 | 485 |

*1 content in terms of acetic acid ion,
*2 content in terms of carboxylic acid ion,
*3 content in terms of metal ion The resin compositions of Comparative Examples 1 to 9 that did not have the characteristic configuration of the present disclosure had low mechanical strength.

In contrast, the resin compositions of Examples 1 to 20 that had the characteristic configuration of the present disclosure had excellent mechanical strength.

Although the above examples show specific embodiments of the present disclosure, the examples are merely examples and should not be construed as limiting the present disclosure. Various alterations that are obvious for those skilled in the art are intended to be within the scope of the present disclosure.

INDUSTRIAL APPLICABILITY

The resin composition according to the present disclosure has excellent mechanical strength. Therefore, a multilayer structure and a molded object including layers made of the resin composition are useful as raw materials of various packaging bodies for general foods, condiments such as mayonnaise and dressings, fermented foods such as soybean paste, oil and fat foods such as salad oil, beverages, cosmetics, medicines, and the like.

The invention claimed is:

1. A resin composition comprising:
a thermoplastic resin (A) that does not contain a polar group;
a thermoplastic resin (B) that contains a polar group;
an ethylene-vinyl alcohol copolymer (C) that has an ethylene content of 20 to 60 mol %;
acetic acid and/or a salt thereof (D);
an aliphatic carboxylic acid (E) having 3 or more carbon atoms; and
an aliphatic carboxylic acid metal salt (F) that is a metal salt of the aliphatic carboxylic acid (E),
wherein the thermoplastic resin (A) that does not contain a polar group is contained in an amount of 66 to 99 wt. % with respect to a total sum of contents of the resin composition, and the ethylene-vinyl alcohol copolymer (C) having an ethylene content of 20 to 60 mol % is contained in an amount of 0.1 to 25 wt. % with respect to the total sum of the contents of the resin composition, and
wherein a weight ratio of a content of the aliphatic carboxylic acid metal salt (F) in terms of metal ion to a content of the acetic acid and/or a salt thereof (D) in terms of acetic acid ion is $0.001 \leq ((F)/(D)) \leq 1.3$.

2. The resin composition according to claim 1, wherein the thermoplastic resin (A) that does not contain a polar group is at least one selected from the group consisting of a polyolefin resin and a polystyrene resin.

3. The resin composition according to claim 1, wherein the thermoplastic resin (A) that does not contain a polar group is at least one selected from the group consisting of polyethylene, polypropylene, and polystyrene.

4. The resin composition according to claim 1, wherein the thermoplastic resin (B) containing a polar group is contained in an amount of 0.1 to 50 wt. % with respect to the total sum of the contents of the resin composition.

5. The resin composition according to claim 1, wherein the thermoplastic resin (B) containing a polar group is a modified thermoplastic resin that contains a carboxy group or an acid anhydride group.

6. The resin composition according to claim 1, wherein the thermoplastic resin (B) containing a polar group is at least one selected from the group consisting of a modified polyolefin resin that contains a carboxy group or an acid anhydride group and a polyvinyl acetate resin.

7. The resin composition according to claim 1, wherein the acetic acid and/or a salt thereof (D) is contained in an amount of 0.01 to 1000 ppm in terms of acetic acid ion with respect to the total sum of the contents of the resin composition.

8. The resin composition according to claim 1, wherein the aliphatic carboxylic acid (E) is contained in an amount of 0.0001 to 150 ppm in terms of carboxylic acid ion with respect to the total sum of the contents of the resin composition.

9. The resin composition according to claim 1, wherein the aliphatic carboxylic acid metal salt (F) is contained in an amount of 0.01 to 90 ppm in terms of metal ion with respect to the total sum of the contents of the resin composition.

10. A method for manufacturing a resin composition, comprising melt-kneading and pelletizing the resin composition according to claim 1.

11. A molded object obtained using the resin composition according to claim 1.

12. A multilayer structure comprising at least one layer made of the resin composition according to claim 1.

13. A packaging body formed from the multilayer structure according to claim 12.

* * * * *